US007990000B2

(12) United States Patent
Suzuki et al.

(10) Patent No.: US 7,990,000 B2
(45) Date of Patent: Aug. 2, 2011

(54) SMALL DIAMETER STEPPING MOTOR, BOBBIN USED THEREIN AND MANUFACTURING METHOD THEREOF

(75) Inventors: Yuzuru Suzuki, Nagano (JP); Takayuki Yamawaki, Nagano (JP); Hiroyuki Furusaki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 12/081,085

(22) Filed: Apr. 10, 2008

(65) Prior Publication Data

US 2008/0252181 A1   Oct. 16, 2008

(30) Foreign Application Priority Data

Apr. 11, 2007   (JP) .................................. 2007-103596

(51) Int. Cl.
*H02K 11/00* (2006.01)
(52) U.S. Cl. ..................... 310/71; 310/49.01; 310/49.55; 310/49.11; 310/49.13; 29/592.1; 29/596
(58) Field of Classification Search ................ 310/49 R, 310/71, 49.01–49.55; 29/592.1, 596
See application file for complete search history.

(56) References Cited

U.S. PATENT DOCUMENTS

| | | | | |
|---|---|---|---|---|
| 5,121,017 | A * | 6/1992 | Yamamoto et al. .......... | 310/49 R |
| 6,043,573 | A * | 3/2000 | Neff et al. .................... | 310/13 |
| 6,825,587 | B2 * | 11/2004 | Yajima et al. ................. | 310/90 |
| 6,876,102 | B2 * | 4/2005 | Alappat ....................... | 307/18 |
| 6,876,109 | B2 * | 4/2005 | Matsushita et al. ......... | 310/49.08 |
| 7,071,593 | B2 * | 7/2006 | Matsushita et al. ........... | 310/257 |
| 7,173,351 | B2 * | 2/2007 | Ogawa ......................... | 310/49 R |
| 7,375,446 | B2 * | 5/2008 | Suzuki et al. .................. | 310/86 |
| 7,446,442 | B2 * | 11/2008 | Horiike ....................... | 310/49.07 |
| 7,449,805 | B2 * | 11/2008 | Bin ............................. | 310/49.14 |
| 2004/0155543 | A1 | 8/2004 | Christoph | |
| 2005/0046305 | A1 * | 3/2005 | Matsushita et al. ........... | 310/257 |
| 2005/0225185 | A1 * | 10/2005 | Mayumi ........................ | 310/90 |
| 2005/0264117 | A1 * | 12/2005 | Hata et al. ...................... | 310/90 |

(Continued)

FOREIGN PATENT DOCUMENTS

JP    2-65648    3/1990

(Continued)

OTHER PUBLICATIONS

Machine translation of JP2004007899, Uematsu, Motor, Jan. 8, 2004.*

*Primary Examiner* — Quyen Leung
*Assistant Examiner* — Terrance Kenerly
(74) *Attorney, Agent, or Firm* — Foley & Lardner LLP

(57) ABSTRACT

In a small diameter stepping motor including two stator units each including a bobbin formed of an insulating material, each bobbin includes: a circular hollow cylinder portion having a winding; two flanges disposed respectively at the both ends of the cylinder portion; and a terminal structure disposed at one of the two flanges and including two terminal blocks and a pair of electrical contact members at which the lead-out lines of the winding are terminated, wherein the two terminal blocks are circumferentially shifted in position from each other with respect to the cylinder portion axis extend axially outwardly, and the terminal blocks of one bobbin intermesh with the terminal blocks of the other bobbin such that the terminal blocks of the one bobbin overhang a part of the winding wound on the other bobbin and vice versa when the two stator units are coupled to each other.

12 Claims, 21 Drawing Sheets

U.S. PATENT DOCUMENTS

| | | | |
|---|---|---|---|
| 2006/0055279 A1* | 3/2006 | Zhan | 310/257 |
| 2007/0222329 A1* | 9/2007 | Bin | 310/257 |

FOREIGN PATENT DOCUMENTS

| | | | |
|---|---|---|---|
| JP | 09163656 | * | 6/1997 |
| JP | 10-257747 | | 9/1998 |
| JP | 11-089207 | | 3/1999 |
| JP | 2004-007899 | | 1/2004 |
| JP | 2004007899 | * | 1/2004 |
| JP | 2004-147426 | | 5/2004 |
| JP | 2004-179498 | | 6/2004 |
| JP | 2006-238617 | | 9/2006 |

* cited by examiner

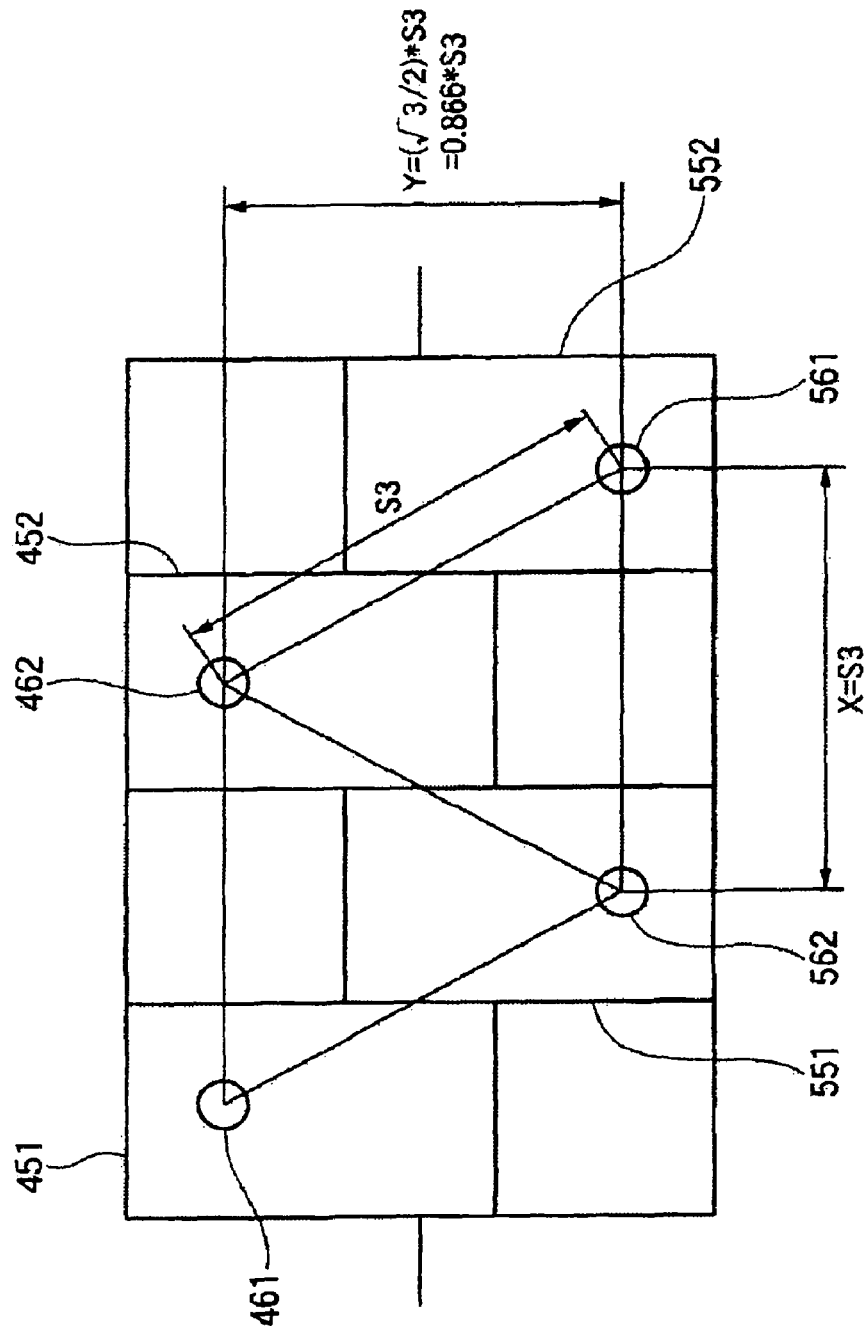

SMALL DIAMETER STEPPING MOTOR, BOBBIN USED THEREIN AND MANUFACTURING METHOD THEREOF

The present application is based upon and claims the benefit of priority from Japanese Patent Application No. JP2007-103596 filed on Apr. 11 of 2007, the entire disclosure of which is incorporated herein by reference.

BACKGROUND OF THE INVENTION

1. Field of the Invention

The present invention relates to a small diameter stepping motor including two stator units each including a bobbin, and to a method for manufacturing the stepping motor.

2. Description of the Related Art

Stepping motors are extensively used in various electronic devices. Some stepping motors include two stator units each including a bobbin which is made of an insulating material, and which has a circular hollow cylinder portion, two flanges formed integrally with the cylinder portion so as to be disposed respectively at the both ends of the cylinder portion, and a terminal structure disposed at one flange of the two flanges and adapted to terminate a pair of lead-out lines of a winding disposed around the cylinder portion. The terminal structure generally includes a terminal block made of an insulating material integrally with the one flange, and two electrical contact members (for example, terminal pins) implanted in the terminal block and connected to the pair of lead-out lines of the winding.

A stepping motor for use in small devices, such as a digital camera (refer to FIG. 11 showing, as an application example, a mechanism of a typical digital camera, where a stepping motor 1 having a small diameter is incorporated in a shutter mechanism 2 disposed behind a lens of a digital camera, such that the stepping motor is disposed at the outer circumference of a circular cylindrical frame 3 to support the shutter mechanism 2, and is adapted to drive the lens for automatic focusing, to conduct an aperture mechanism, and to perform other like functions.) and a mobile telephone, is increasingly required to be downsized without impairing its performance or even with achieving an enhanced performance. Under such circumstances, the configuration of the terminal structure of a bobbin is a critical factor in terms of ensuring the workability of assembling a stepping motor in the effort of downsizing its diameter.

FIGS. 12 to 15 each show both or one of a pair of conventional bobbins 101 and 201 to be housed in respective stator frames. The bobbins 101 and 201 are structured to achieve the downsizing of a stepping motor (refer to Japanese Patent Application Laid-Open No. 2004-7899).

Referring to FIGS. 12 and 13, the bobbins 101 and 201 are made of an insulating material, and each of the bobbins 101 and 201 includes a circular hollow cylinder portion 102 (202), and two flanges 103 and 103 (203 and 203) integrally formed with the cylinder portion 102 (202) and disposed respectively at the both ends of the cylinder portion 102 (202). The bobbins 101 and 201 structured as described above and housed in respective stator frames (not shown) are put together coaxially with respect to an axis O such that their respective one flanges 103 and 203 are set adjacent to each other.

The bobbins 101 and 201 further include terminal structures 111 and 211, respectively. The terminal structures 111 and 211 are disposed respectively at the one flanges (hereinafter referred to as terminal flanges as appropriate) 103 and 203 which are set adjacent to with each other. The terminal structure 111 (211) includes a terminal block 121 (221), a bridge portion 122 (222) connecting the terminal block 121 (221) integrally with the terminal flange 103 (203), and a pair of terminal pins 131 (231) and 132 (232) as electrical contact members which are made of an electrical conductive material, implanted at the terminal block 121 and to which lead-out lines of a winding wound around the cylinder portion 102 (202) are connected.

The bridge portion 122 (222) is formed integrally with the terminal flange 103 (203) so as to extend axially outwardly from the outer circumference of the terminal flange 103 (203), that is to say, extend away from the other flange (non-terminal flange) 103 (203). The terminal block 121 (221) integrally extends axially from the distal end of the bridge portion 122 (222) so as to overhang a part of the cylinder portion 202 (102) of the bobbin 201 (101) to which the bobbin 101 (201) is coupled.

Referring additionally to FIGS. 14 and 15, the bridge portion 122 has a width (circumferential direction dimension) defined by W1, and is positioned circumferentially off a diametrical line L1 (FIG. 14) of the bobbin 101, which passes substantially the center of the terminal block 121. In the same way, though not specifically shown, the bridge portion 222 has a width (circumferential direction dimension) defined by W1, and is positioned circumferentially off a diametrical line (not shown) of the bobbin 201, which passes substantially the circumferential center of the terminal block 221.

As seen in FIG. 14 and understood from the preceding description, the terminal block 121/221 is divided into two substantially equal portions with respect to the diametrical line L1 of the bobbin 101 (201), and the terminal pin 131 (231) disposed at one half portion of the terminal block 121 (221) is located line-symmetric with the terminal pin 132 (232) disposed at the other half portion thereof with respect to the diametrical line L1.

The above-described two bobbins 101 and 201 having their respective windings thereon are coupled to each other in the following manner. The bobbins 101 and 201 are brought together coaxially such that the respective terminal flanges 103 and 203 having the terminal structures 111 and 211 are set adjacent to each other with their bridge portions 122 and 222 circumferentially shifted from each other. Then, the bobbins 101 and 201 are rotated relatively with respect to each other in the circumferential direction indicated by an arrow Z (see FIG. 14) until the respective opposite circumferential ends of the bridge portions 122 and 222 come into contact with each other. The bobbins 101 and 201 arranged as described above are disposed in the respective stator frames (not shown).

The above-described configuration of the terminal structure 111 (211) of the bobbin 101 (201) is advantageous and effective in reducing the diameter of a stepping motor, and the following description explains the background for the advantage and effectiveness by taking as an example a stepping motor having a bobbin diameter of, for example, more than 10 mm, which is generally considered to be a relatively large diameter in the field of the present invention, specifically for use in a digital camera, a mobile telephone, and the like.

Referring to FIGS. 16A and 16B showing typical terminal pin layouts of stepping motors with a relatively large diameter as described above, in the both layouts, when two bobbins 301 and 401 are coupled to each other, a pair of terminal pins 331 and 332 of the bobbin 301 and a pair of terminal pins 431 and 432 of the bobbin 401 are usually arranged in a substantially straight line located along the interface plane between two stator frames housing the bobbins 301 and 401, respectively. In such a terminal pin arrangement, a distance S1 defined between the respective centers of two adjacent terminal pins (for example, terminal pins 331 and 431) is about half of a distance S2 defined between the respective centers of the pair of terminal pins 331 and 332 (431 and 432) of the bobbin 301 (401). Under the circumstance described above, if the stepping motor is to be downsized making the distance S1 smaller, it becomes practically difficult to perform a soldering operation for connecting the terminal pins 331, 332, 431 and 432 to a flexible printed circuit (FPC), and the like.

Accordingly, if the minimum distance required between two adjacent terminal pins for allowing a soldering operation to be performed at each terminal pin without impairing the workability is defined "S3 (not indicated in FIGS. 16A and 16B; to be further described later with reference to FIG. 5C)", the aforementioned distance S2 between the centers of the pair of terminal pins must be set equal to or greater than double the minimum distance S3, thus establishing a formula: S2≧2×S3 (or S2/2≧S3). Since the distance S2 is proportional to the diameter of a bobbin, the minimum value of the bobbin diameter is subject to restriction, and it is practically not possible to set the diameter of a stepping motor at, for example, 10 mm or less.

On the other hand, in the pin terminal arrangement resulting from the structure of the bobbin 101 (201) shown in FIGS. 12 to 15, it is not necessary to pay attention to the above-defined distance S1 in consideration of the workability in a soldering operation, and the above-defined distance S2 can be as small as the above-defined distance S3, thus establishing a formula: S2≧S3. Consequently, the diameter of the bobbin 101 (201), to which the distance 2S is proportional, can be reduced to about half of the diameter of the bobbin 301 (401) whose terminal pin layouts are shown in FIGS. 16A and 16B.

In the bobbin 101 (201), however, the bridge portion 122 (222) formed by injection molding, or a like method integrally with the terminal flange 103 (203) is likely to be deformed as a whole causing positional change of the terminal block 121 (221) formed to communicate directly with the bridge portion 122 (222), which results in materially deteriorating the positional accuracy of the pair of terminal pins 131 and 132 (231 and 232) implanted in the terminal block 121 (221), thus yielding defective windings and also hindering automation of a soldering process at an FPC.

Also, when the bobbins 101 and 201 are coupled to each other, the terminal flanges 103 and 203 having their respective terminal structures 111 and 211 are coaxially set adjacent to each other by axial direction operation with their respective terminal structures 111 and 211 shifted from each other, and then the bridge portions 122 and 222 of the terminal portions 111 and 211 are brought into contact with each other by circumferential rotation operation, thus requiring two different operation steps, which results in an increased time for production.

Further, the lead-out lines from the windings, if loosely wired to the terminal pins 131, 132, 231 and 232, are likely to be caught by some portions of the bobbins 101 and 201 and broken at the time of the aforementioned rotation operation.

SUMMARY OF THE INVENTION

The present invention has been made in order to overcome the problems described above, and it is an object of the present invention to provide a stepping motor in which the positional accuracy of terminal pins is enhanced for enabling automation of the process of soldering to an external circuit (flexible printed board), bobbins have an identical configuration and are so structured as to allow two stator units to be assembled with a reduced number of process operations, and lead-out lines of a winding are prevented from getting scrubbed or caught to be damaged during the process operations, also to provide a method of manufacturing such the stepping motor, and further to provide a bobbin for use in such the stepping motor.

According to a first aspect of the present invention, there is provided a small diameter stepping motor including two stator units which each have an opening portion and each include a bobbin formed of an insulating material. In the stepping motor, the bobbin includes: a circular hollow cylinder portion having a winding wound therearound; two flanges disposed respectively at the both ends of the cylinder portion; and a terminal structure disposed at one flange of the two flanges, radially projecting out through the opening portion, and including at least two terminal blocks and a pair of electrical contact members at which lead-out lines of the winding are terminated, wherein the at least two terminal blocks are shifted in position from each other in a circumferential direction about an axis of the cylinder portion and extend axially outwardly, and the terminal blocks of one bobbin of the two bobbins intermesh with the terminal blocks of the other bobbin of the two bobbins such that the terminal blocks of the one bobbin overhang a part of the winding wound on the other bobbin and vice versa when the two stator units are coupled to each other.

In the first aspect, a formula: $Y \geq (\sqrt{3}/2)X$ may be established, where X is a circumferential distance between the pair of electrical contact members of each of the two bobbins, and Y is an axial shift distance between the electrical contact member of the one bobbin and the electrical contact member of the other bobbin.

In the first aspect, the two bobbins each may have grooves to guide and house the lead-out lines of the winding.

In the first aspect, the opening portion may have a shape corresponding to a configuration of the terminal structure such that the opening portion is substantially fully occupied by the at least two terminal blocks of the bobbin when the two stator units are coupled to each other.

In the first aspect, the two bobbins may be configured identically with each other.

According to a second aspect of the present invention, there is provided a method of manufacturing a small diameter stepping motor, which includes: a first step, where a bobbin, which is formed of an insulating material, and which includes: a hollow circular cylinder portion; two flanges formed respectively at both ends of the cylinder portion; and a terminal structure which is formed at one flange of the two flanges, includes at least two terminal blocks located circumferentially shifted from each other and extending axially outwardly, and which further includes a pair of electrical contact members to have lead-out lines of the winding terminated thereat, is put into an outer yoke of a stator frame which has a plurality of pole teeth at its inner circumference; a second step, where an inner yoke of the stator frame having a plurality of pole teeth at its inner circumference is attached to the outer yoke having the bobbin housed therein, such that their respective pole teeth intermesh with each other thereby forming a stator unit; and a third step, where two of such stator units are engagingly coupled to each other such that the at least two terminal blocks of the terminal structure of the bobbin of one stator unit intermesh with the at least two terminal blocks of the terminal structure of the bobbin of the other stator unit.

In the second aspect, the two stator units may be engagingly coupled to each other without rotation operation.

According to a third aspect of the present invention, there is provided a bobbin formed of an insulating material, which includes: a hollow circular cylinder portion having a winding wound therearound; two flanges disposed respectively at the both ends of the cylinder portion; and a terminal structure disposed at one flange of the two flanges and including at least two terminal blocks and a pair of electrical contact members at which starting and finishing lead-out lines of the winding are terminated, wherein the at least two terminal blocks are shifted in position from each other in a circumferential direction about an axis of the cylinder portion and extend both axially outwardly and radially outwardly, and wire paths each adapted to guide and house one of the starting and finishing lead-out lines of the winding is provided at any terminal block of the at least two terminal blocks, that is provided with the electrical contact member.

In the third aspect, the wire path for the starting lead-out line of the winding may be disposed at one terminal block provided with the electrical contact member and connect between the one terminal block and the cylinder portion, and the wire path for the finishing lead-out line of the winding may be disposed at a portion of another terminal block provided with the electrical contact element, the portion facing the one terminal block having the wire path for the starting lead-out line.

BRIEF DESCRIPTION OF THE DRAWINGS

FIG. 5C is a top plan view of a variation of a terminal pin layout of the stepping motor of FIG. 1, where Y is set at the minimum;

DETAILED DESCRIPTION OF THE INVENTION

Exemplary embodiments of the present invention will be described with the accompanying drawings.

A first embodiment of the present invention will hereinafter be described with reference to FIGS. 1 to 7C.

Figure 1:
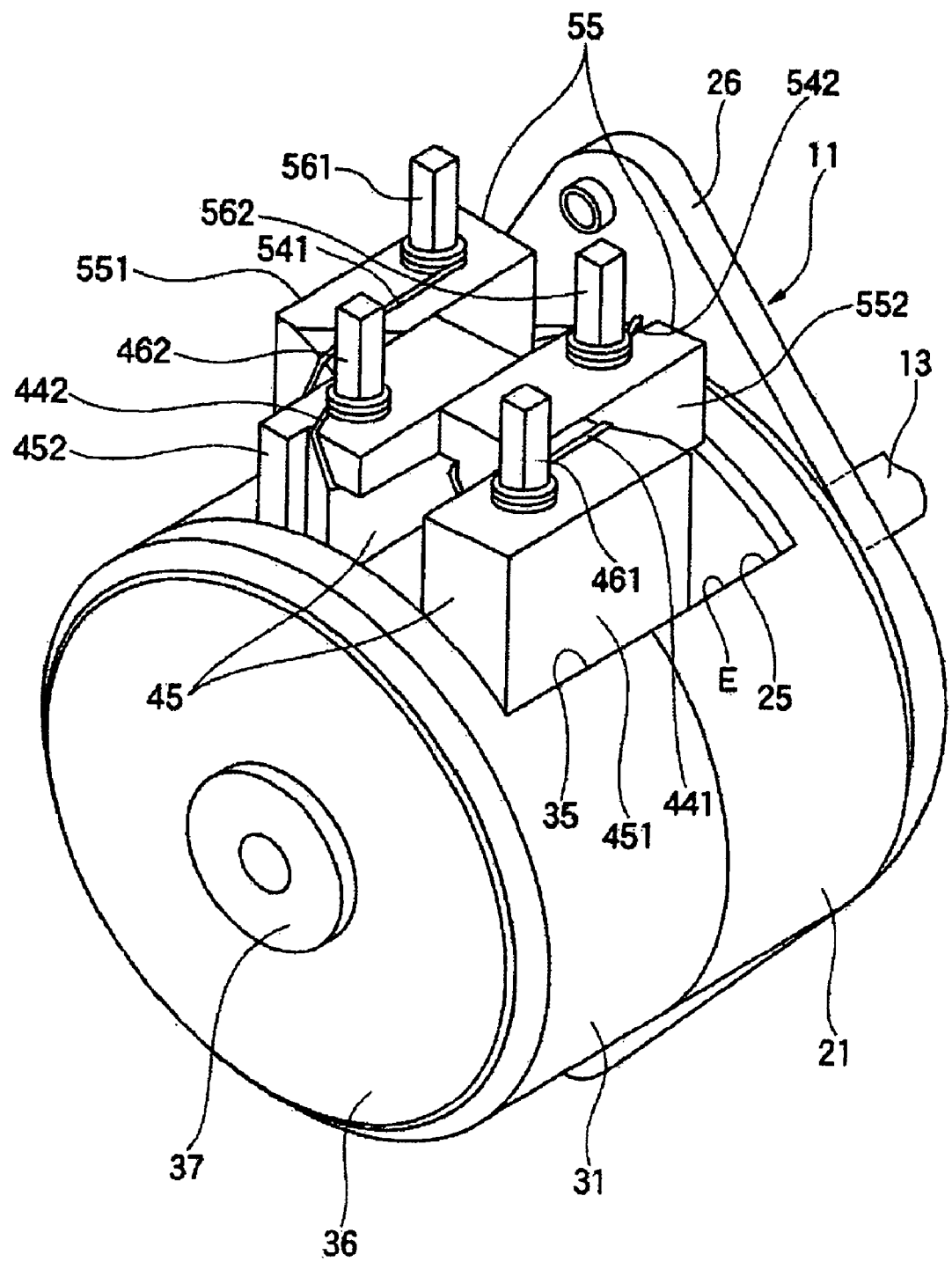
FIG. 1 is a perspective view of a stepping motor according to a first embodiment of the present invention.
Figure 2:
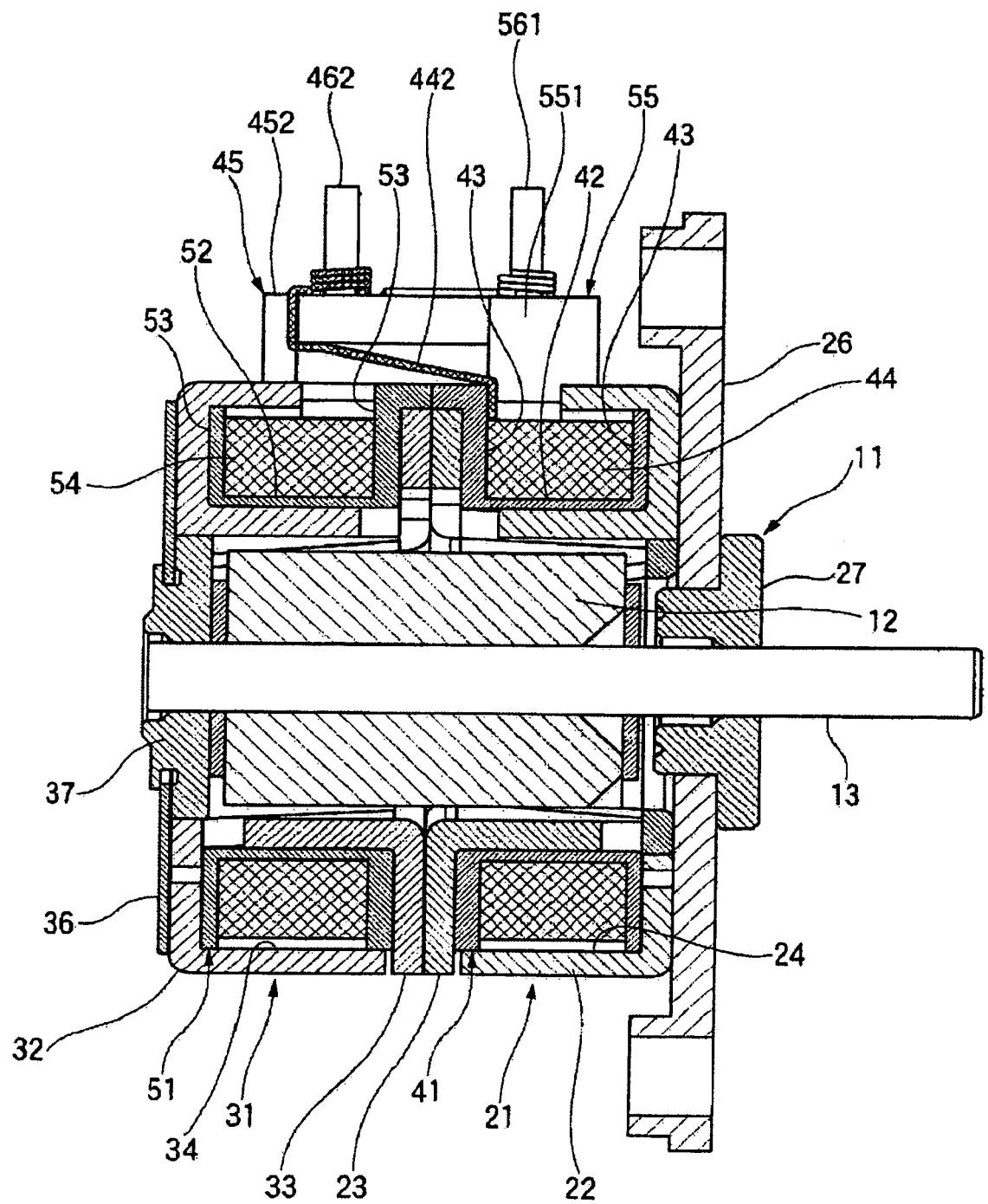
FIG. 2 is an axial cross sectional view of the stepping motor of FIG. 1.

Referring to FIGS. 1 and 2, a stepping motor 11 according to the first embodiment is basically composed of a stator assembly and a rotor assembly. The rotor assembly includes a magnet 12 and a shaft 13. The stator assembly is made up of two (first and second) stator units 21 and 31 which respectively include: first and second stator frames 22+23 and 32+33 having a cylindrical configuration; first and second bobbins 41 and 51 housed respectively in the first and second stator frames 22+23 and 32+33; and first and second windings 44 and 54 wound respectively around the first and second bobbins 41 and 51.

The first stator frame 22+23 is structured such that an outer yoke 22 is engaged with an inner yoke 23 thereby forming a doughnut-shaped case having therein an empty space 24 to house the first bobbin 41. A front plate 26 for attachment to, for example, a camera frame is fixedly attached to the outer yoke 22, and a bearing 27 to rotatably support the rotary shaft 13 is engagingly attached at the center of the front plate 26.

The second stator frame 32+33 is composed of outer and inner yokes 32 and 33 and structured in the same way as the first stator frame 22+23, thereby forming a doughnut-shaped case having therein an empty space 34 to house the second bobbin 51. A rear plate 36 is fixedly attached to the outer yoke 32, and a bearing 37 to rotatably support the rotary shaft 13 is engagingly attached at the center of the rear plate 36. The first and second stator frames 22+23 and 32+33 having the first and second windings 44 and 45 therein are coupled to each other with their respective inner yokes 23 and 33 set in contact with each other.

The outer yokes 22 and 32, which constitute the outer circumferences and the outer ends of the first and second stator frames 22+23 and 32+33, respectively, have respective opening portions 25 and 35 formed at their outer circumferences, through which a structure for wire termination (to be described later) projects out radially, whereby starting and finishing lead-out lines 441 and 442 of the first winding 44 and starting and finishing lead-out lines 541 and 542 of the second winding 54 are allowed to go out of the first and second stator frames 22+23 and 32+33, respectively. In this connection, the opening portion 25/35 may alternatively be shaped according to the configuration of the structure for wire termination such that there is no substantial open area left (refer to FIG. 5B) when the two stator units 21 and 31 are coupled to each other, whereby foreign substances are prevented from coming into the stator frames 22+23 and 32+33, which results in eliminating a short circuit problem, and the like.

Figure 3:
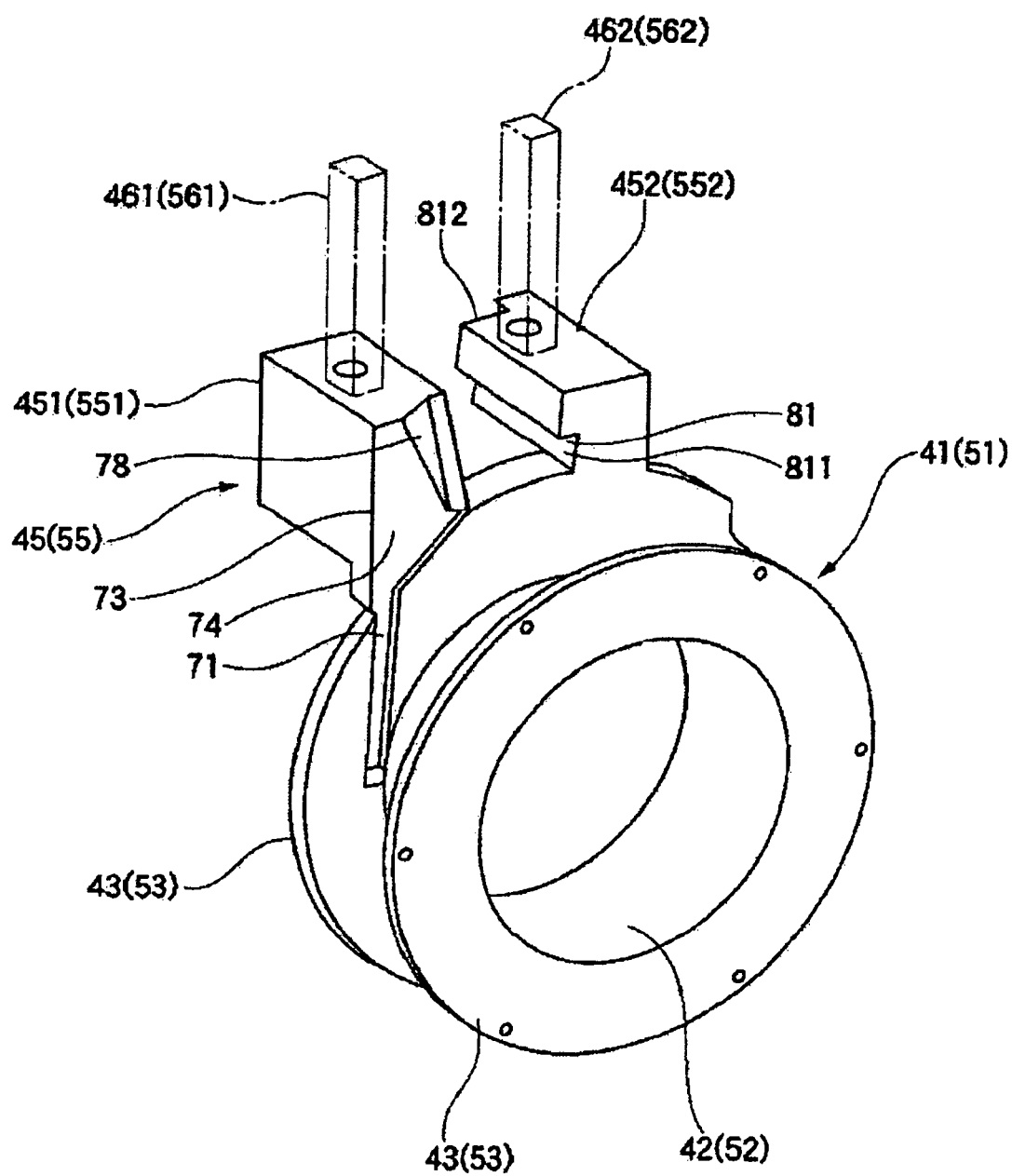
FIG. 3 is a perspective view of one bobbin of a pair of bobbins of the stepping motor of FIG. 1, seen from above.
Figure 4:
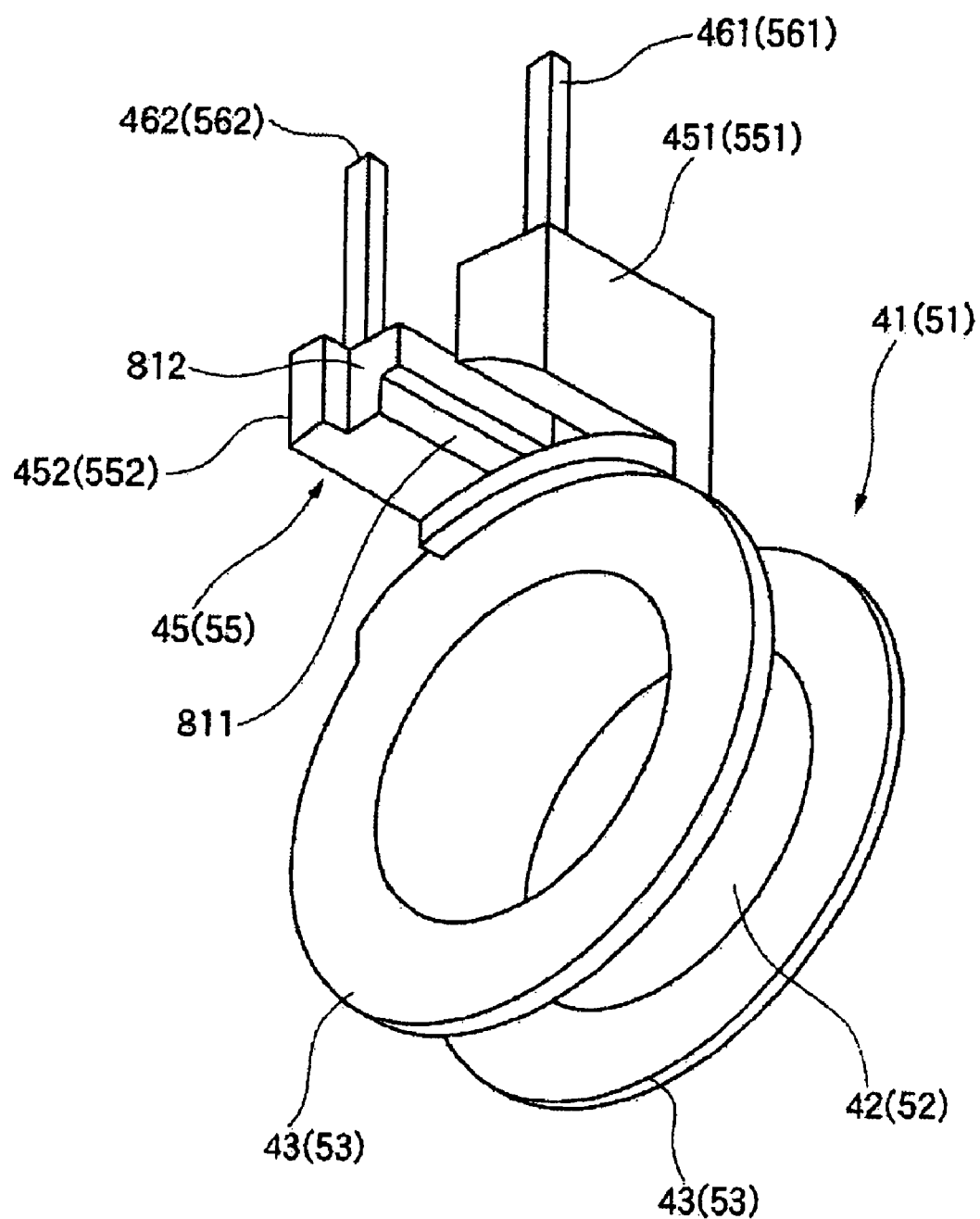
FIG. 4 is a perspective view of an opposite side of the bobbin of FIG. 3, seen from below.

The first and second bobbins 41 and 51 have the same configuration (structure). Referring to FIGS. 3 and 4, the first (second) bobbin 41 (51) is integrally formed of an insulating material (resin material) by injection molding and includes: a circular hollow cylinder portion 42 (52); two flanges 43 (53) formed integrally at respective both ends of the cylinder portion 42 (52); and a first (second) terminal structure (i.e., the aforementioned structure for wire termination) 45 (55) which is integrally formed at one flange (terminal flange) of the two flanges 43 (53) and at which the lead-out lines 441 and 442 (541 and 542) of the first (second) winding 44 (54) wound around the cylinder portion 42 (52) are terminated.

The terminal structure 45 (55) includes: a first terminal block 451 (551) and a second terminal blocks 452 (552) which are both formed in a substantially rectangular solid, have a circumferential direction dimension substantially equal to each other, are positioned to be circumferentially shifted from each other with a gap therebetween substantially equal to the circumferential direction dimension of each of the first and second terminal blocks 451 and 452 (551 and 552), and which extend radially outwardly in parallel with each other along the diametrical line of the cylinder portion 42 (52) while extending axially outwardly in parallel with each other from the outer circumferential end of the terminal flange 43 (53); and a pair of terminal pins 461 and 462 (561 and 562) as electrical contact members implanted respectively in the first and second terminal blocks 451 and 452 (551 and 552). The first and second terminal blocks 451 and 452 and (551 and 552) are made of an insulating material (resin material) to communicate integrally with the terminal flange 43 (53), and the pair of terminal pins 461 and 462 (561 and 562) are of a wire wrap type made of an electric conductive material, around which the lead-out lines 441 and 442 (541 and 542) of the winding 44 (54) are wrapped for termination.

When the first and second stator units 21 and 31 including the first and second stator frames 22+23 and 32+33, in which the first and second bobbins 41 and 51 having the first and second windings 44 and 54 wound therearound are housed respectively, are coupled to each other, the terminal blocks 451 and 452 of the first terminal structure 45 of the first bobbin 41 are adapted to overhang a part of the second bobbin 51 so as to engage with the terminal blocks 551 and 552 of the second terminal structure 55 of the second bobbin 51, which overhang a part of the first bobbin 41, as shown in FIG. 1.

Figure 5A:
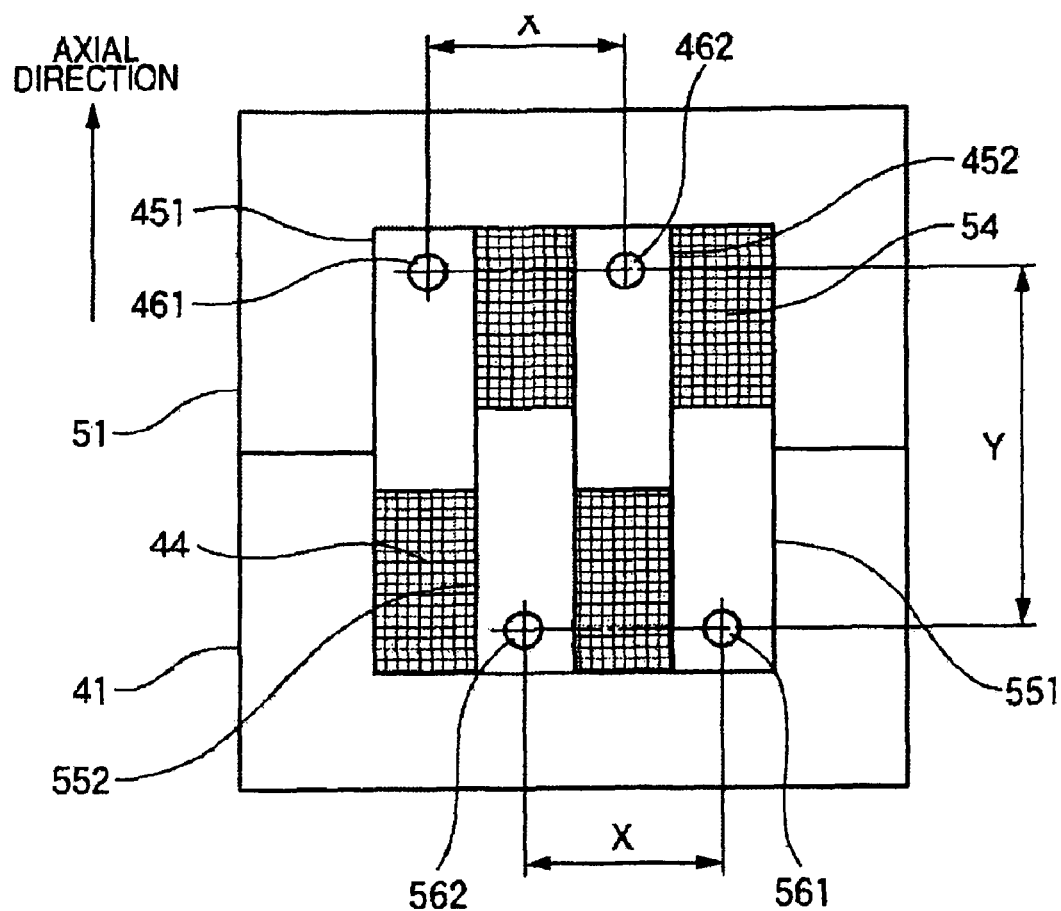
FIG. 5A is a top plan view of a terminal pin layout of the stepping motor of FIG. 1.
Figure 5B:
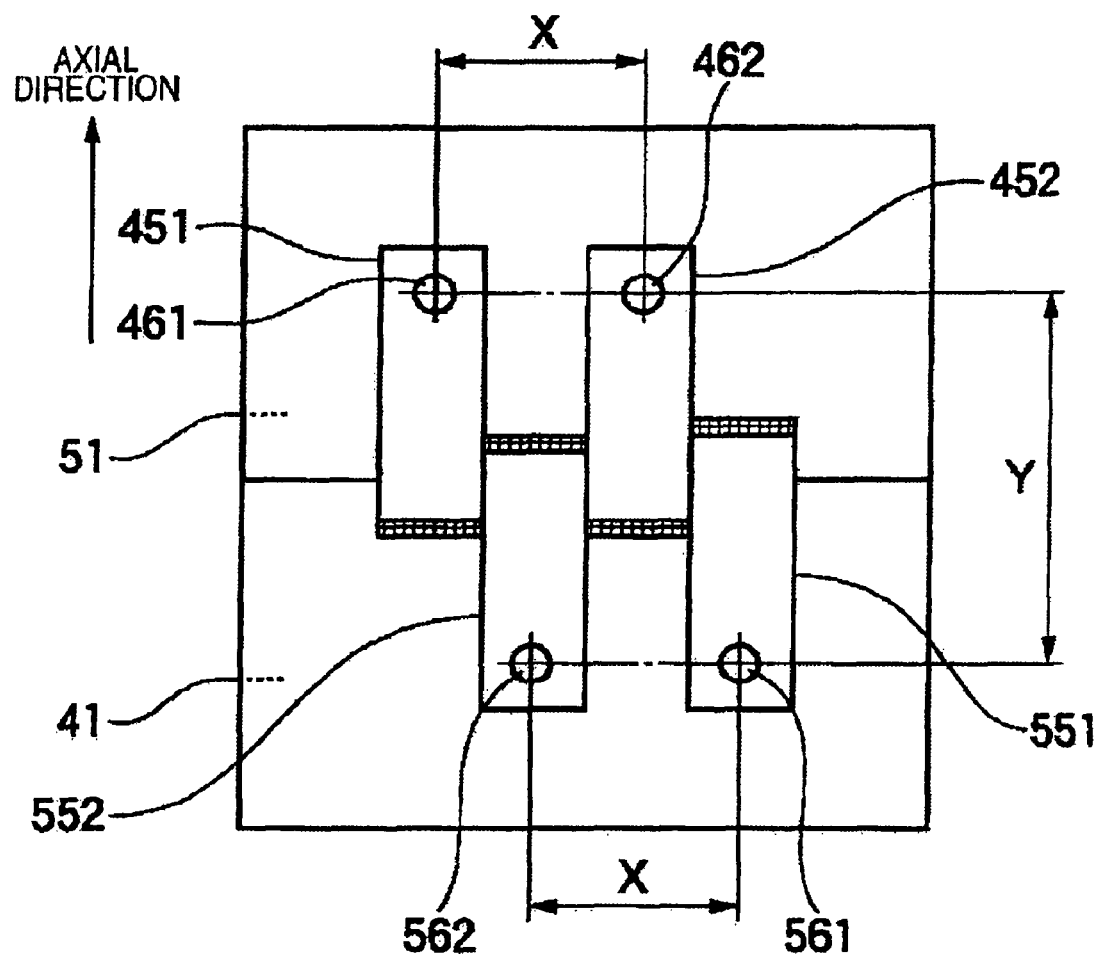
FIG. 5B is a top plan view of the terminal pin layout of FIG. 5A but with a different shape of an opening portion of a stator frame.
Figure 16A:
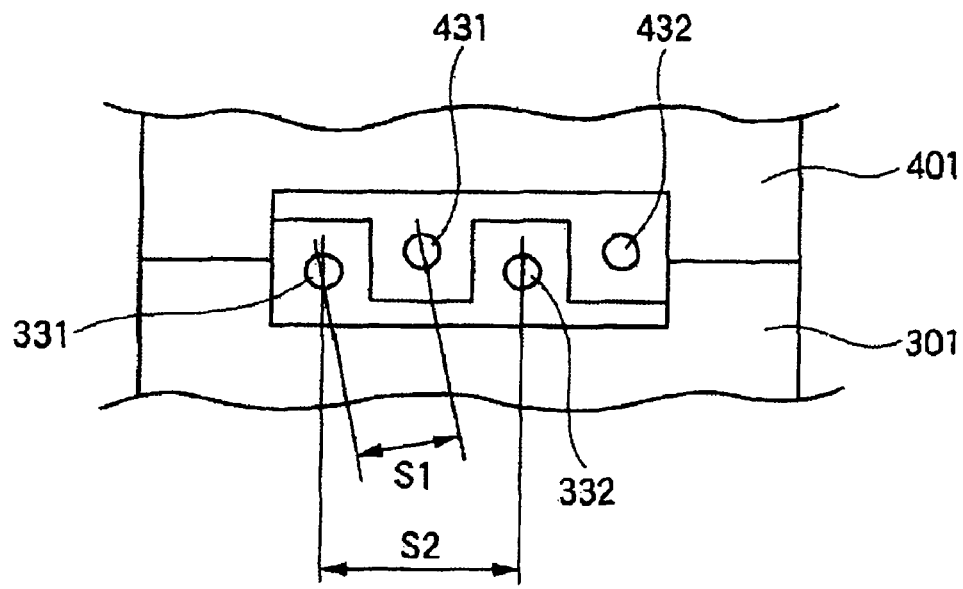
FIGS. 16A and 16B are top plan views of terminal pin layouts of conventional stepping motors.
Figure 16B:
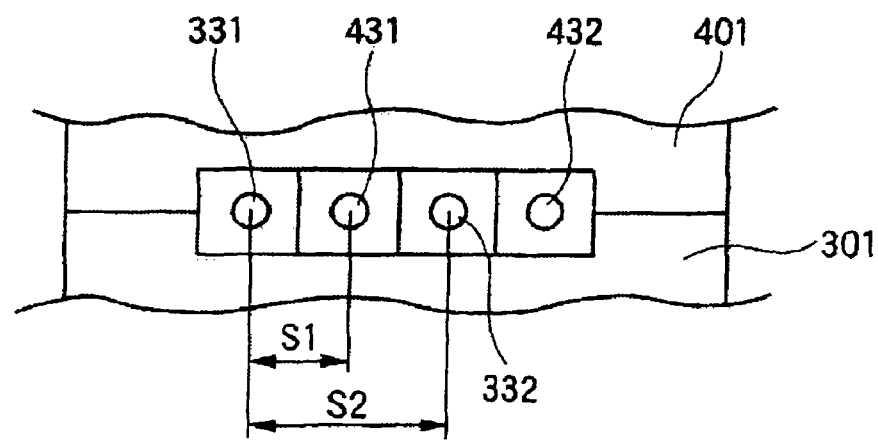

In the stepping motor 11 according to the present embodiment, the terminal pins 461 462, 561 and 562 of the first and second bobbins 41 and 51 disposed in the first and second stator frames 22+23 and 32+33 are arranged, as shown in FIG. 5A, such that the pair of terminal pins 461 and 462 of the first bobbin 41 and the pair of terminal pins 561 and 562 of the second bobbin 51 are located to be axially shifted in respective opposite directions away from the interface plane between the first and second stator frames 22+23 and 32+33, specifically between the inner yokes 23 and 33 thereof, rather than arranged in a substantially straight line located along the interface plane between two stator frames (refer to FIGS. 16A and 16B).

In the stepping motor 11 according to the present embodiment, the terminal pin layout is determined so that the following formula is established: $Y \geq (\sqrt{3}/2)X$, where X is a circumferential distance between the respective centers of the pair of terminal pins 461 and 462 (561 and 562) of the bobbin 41 (51), and Y is an axial shift distance between the terminal pin 461/462 of the first bobbin 41 and the terminal pin 561/562 of the second bobbin 51. From the formula set forth above, the circumferential distance X can be set to as small as the earlier mentioned minimum distance 3S (for allowing a soldering operation to be performed at each terminal pin without impairing the workability). When the axial shift distance Y is set at the smallest, that is to say $Y=(\sqrt{3}/2)X$, an equilateral tangle is defined by three of the four terminal pins 461, 462, 561 and 562 as shown in FIG. 5C, where the circumferential distance X is set to the minimum distance 3S.

Referring to FIG. 3, the bobbin 41 (51) further includes a first wire path 71 to guide and house the starting lead-out line 451 (551) of the winding 44 (54) connected to the terminal pin 461 (561), and a second wire path 81 to guide and house the finishing lead-out line 452 (552) of the winding 44 (54) connected to the terminal pin 462 (562).

The first wire path 71 is constituted by a groove formed at the inner face of the terminal flange 43 (53) in line with an outer edge line 73 of an axially proximal end face 74 of the first terminal block 451 (551) facing the non-terminal flange 43(53). The first wire path 71 starts at the cylinder portion 42 (52) and communicates flush with the end face 74 of the first terminal block 451 (551), whereby the starting lead-out line 451 (551) is prohibited from protruding above the plane of the inner face of the terminal flange 43 (53), which results in preventing the starting lead-out wire 451 (551) from getting scrubbed or caught and also results in enabling alignment winding.

Referring also to FIG. 4, the second wire path 81 is composed of an axial passage 811 formed at the radially inward edge of a circumferentially facing face of the second terminal block 452 (552) facing the first terminal block 451 (551), and a radial passage 812 formed at a portion of the axially distal end face of the second terminal block 452 (552) located toward the aforementioned circumferentially facing face, wherein the axial passage 811 communicates with the radial passage 812 at the corner. Provision of the axial passage 811, in combination with the radial passage 812, works not only to neatly guide the finishing lead-out line 442 (542) but also to securely keep the finishing lead-out line 442 (542) away from an edge E of the opening portion 25 (35) of the first and second stator frames 22+23 and 32+33.

A corner portion of the axially proximal end face 74 of the first terminal block 451 (551), which is located toward the second terminal block 452 (552), is removed thus forming a chamfered face 78 as shown in FIG. 3. This chamfered structure of the corner portion of the first terminal block 451 (551) prevents the finishing lead-out line 442 (542) from getting scrubbed or caught with any part of the first terminal block 451 (551) when the finishing lead out line 442 (542) is wired through the axial passage 811.

Figure 6A:
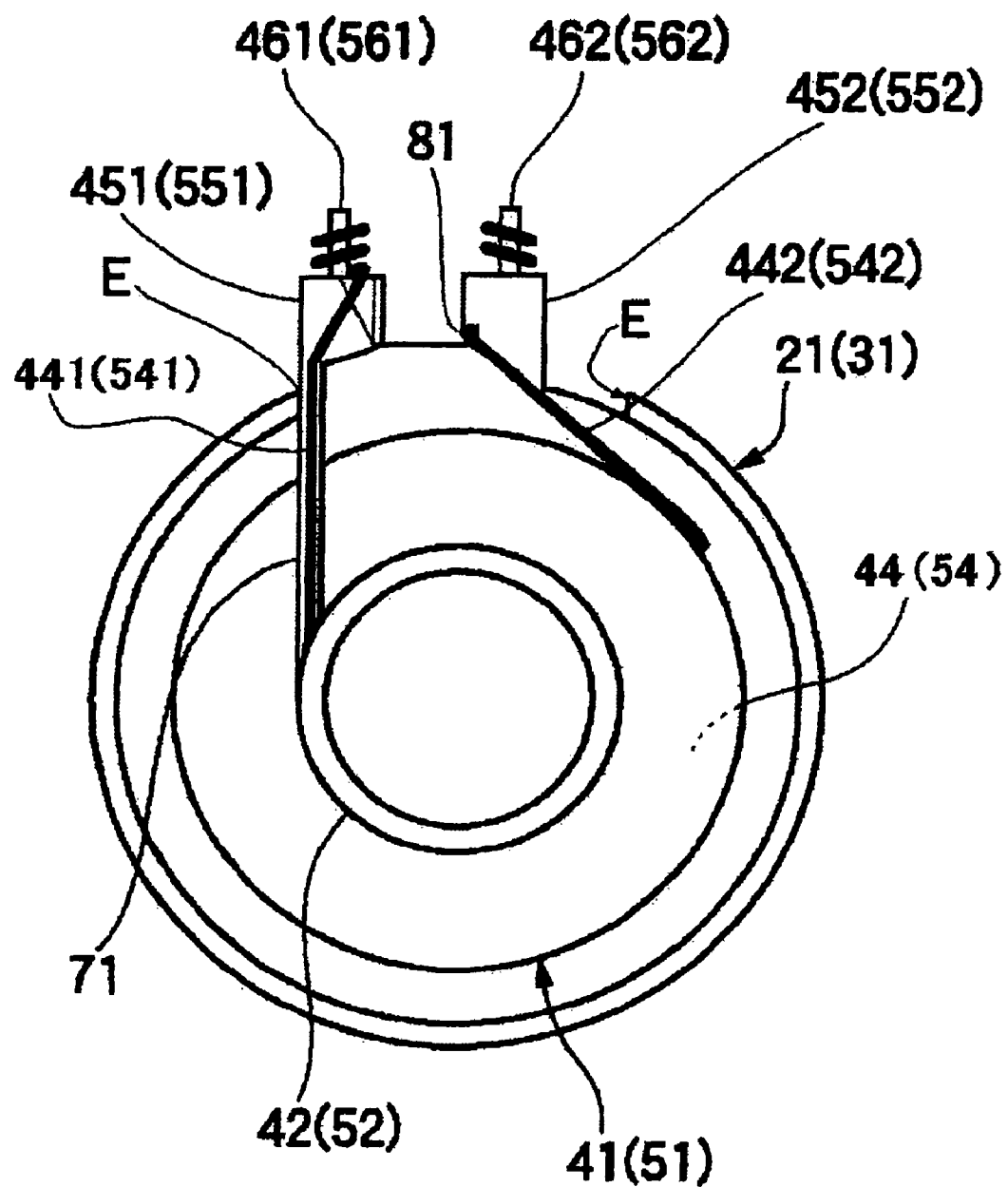
FIG. 6A is an explanatory view of a wiring of lead-out lines of a winding in the stepping motor of FIG. 1.

With the first and second wire paths 71 and 81 arranged as described above, the lead-out lines 441 (541) and 442 (542) of the winding 44 (54) can be guided respectively to the pair of terminal pins 461 (561) and 462 (562) without crossing each other as shown in FIG. 6A.

Figure 6B:
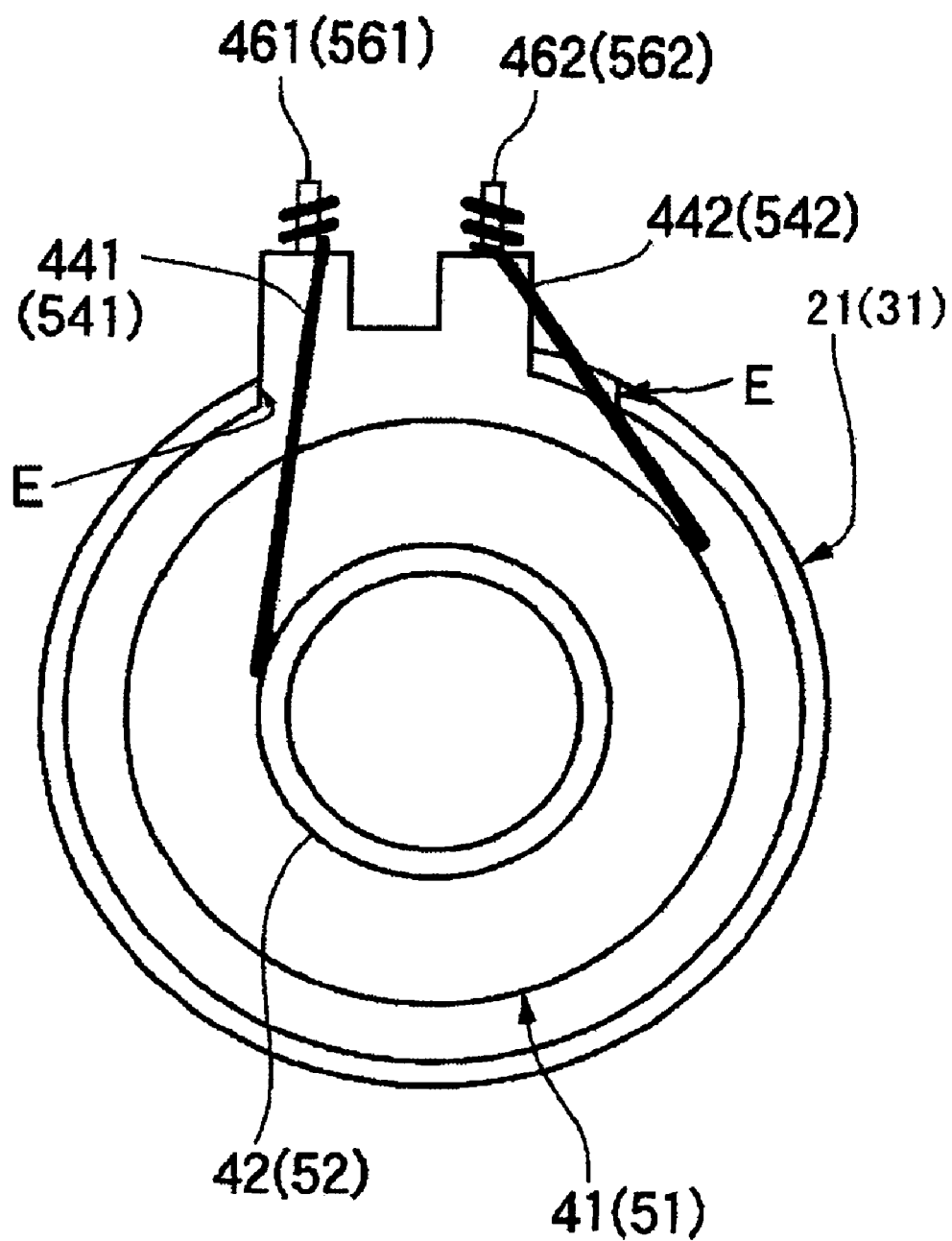
FIG. 6B is a comparative view of a wiring of lead-out lines of a winding without provision of a wire path at a terminal block of a bobbin, where the lines do not cross each other.

Referring to FIG. 6A, in the wire path structure described above, the wire path 81 to guide the finishing lead-out line 442 (542) is disposed at a portion of the second terminal block 452 (552) located closer to the center of the cylinder portion 42 (52) of the bobbin 41 (51), whereby the finishing lead-out line 442 (542) is adapted to take off from the outer circumference of the winding 44 (54) at a reduced angle thus preventing it from happening that the finishing lead-out line 442 (542) is very close to or even in contact with the edge E of the stator frame 22+23 (32+33) as shown in FIG. 6B where the finishing lead-out line 442 (542) goes directly to the terminal pin 462 (562).

Figure 6C:
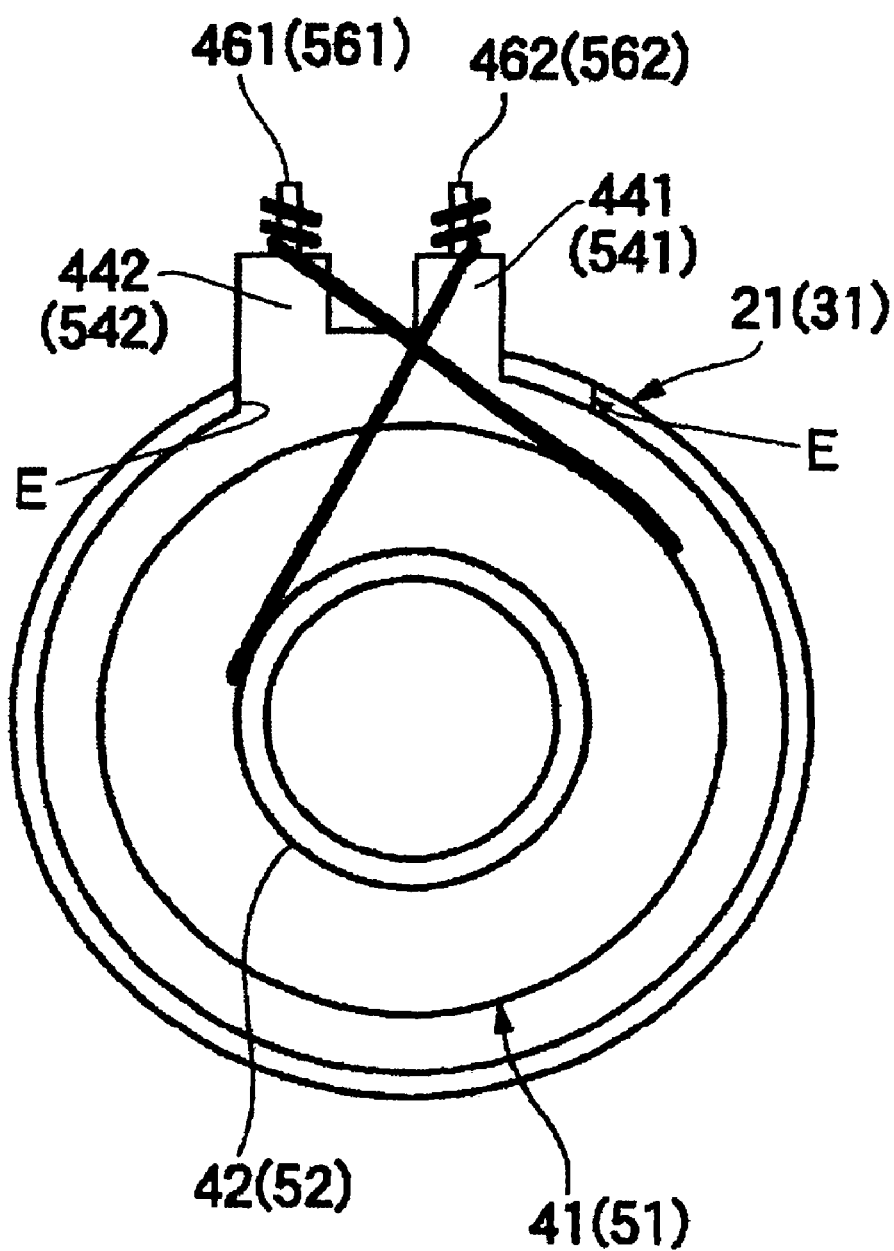
FIG. 6C is another comparative view of a wiring of lead-out lines of a winding without provision of a wire path at a terminal block of a bobbin, where the lines cross each other.

In this connection, for preventing the finishing lead-out line 462 (562) from making contact with the edge E of the stator frame 22+23 (32+33), the starting and finishing lead-out lines 441 (541) and 442 (542) may be arranged to cross each other as shown in FIG. 6C, but such a wire arrangement is likely to cause a problem, such as a short circuit, which can be surely prevented by the wire arrangement shown in FIG. 6A where the finishing lead-out line 442 (542) does not cross the starting lead-out line 441 (541).

Description will now be made on a method of manufacturing the stepping motor 11 according to the first embodiment.

The method of manufacturing the stepping motor 11 shown in FIGS. 1 and 2 includes the following process of preparing a stator assembly:

a step 1, where the first and second bobbins 41 and 51, each of which is formed of an insulating material and basically includes: the hollow circular cylinder portion 42 (52) having the winding 44 (54) wound therearound; the two flanges 43 and 43 (53 and 54) formed respectively at the both ends of the cylinder portion 42 (52); and the terminal structure 45 (55) formed at the terminal flange 43 (53) of the two flanges 43 and 43 (53 and 53) and including the first and second terminal blocks 451 and 452 (551 and 552) located circumferentially shifted from each other, extending axially outwardly and provided respectively with the pair of terminal pins 461 and 462 (561 and 562) having the lead-out lines 441 and 442 (541 and 542) of the winding 44 (54) wrapped therearound, are put respectively into the outer yokes 22 and 32 each of which has a plurality of pole teeth at its inner circumference;

a step 2, where the inner yokes 23 and 33 each of which has a plurality of pole teeth at its inner circumference are attached respectively to the outer yokes 22 and 32 having the bobbins 41 and 51 housed therein, such that their respective pole teeth intermesh with each other, thereby forming the two stator units 21 and 31; and a step 3, where the two stator units 21 and 31 are engagingly coupled to each other such that the first and second terminal blocks 451 and 452 of the terminal structure 45 of the bobbin 41 intermesh with the first and second terminal blocks 551 and 552 of the terminal structure 55 of the bobbin 51.

In the above-described process of producing the stator assembly of the stepping motor 11, the two stator units 21 and 31 can be firmly coupled together without requirement of circumferential rotation operation.

The stator assembly prepared as described above is put together with the rotor assembly including the magnet 12 and the shaft 13 via the bearings 27 and 37, and the stepping motor 11 shown in FIG. 1 is completed.

In the stepping motor 11 according to the first embodiment as described above, the four terminal pins 461, 462, 561 and 562 are disposed such that the pair of terminal pins 461 and 462 of the first bobbin 41 are located over the outer circumference of the second bobbin 51 while the pair of terminal pins 561 and 562 of the second bobbin 51 are located over the outer circumference of the first bobbin 41, wherein the pair of terminal pins 461 and 462 of the first bobbin 41 stand away from the pair of terminal pins 561 and 562, respectively, by a distance Y in the axial direction as shown in FIG. 5A. In such a terminal pin layout, a distance X defined between the pair of terminal pins 461 and 462 (561 and 562) in the circumferential direction can be set to the earlier described minimum distance S3 which allows a soldering operation to be performed at each terminal pin without impairing the workability. That is to say, comparing with the disposition of the four terminal pins, specifically one pair of 331 and 332, and another pair of 431 and 432, which are arranged in a line in the circumferential direction as shown in FIGS. 16A and 16B, the distance between the pair of terminal pins 461 and 462 (561 and 562) in the stepping motor 11 can be reduced to the half of the distance S2 between the pair of terminal pins 331 and 431 (331 and 432), whereby the diameter of the bobbin 41 (51), consequently the diameter of the stepping motor 11, can be comfortably reduced.

Figure 7A:
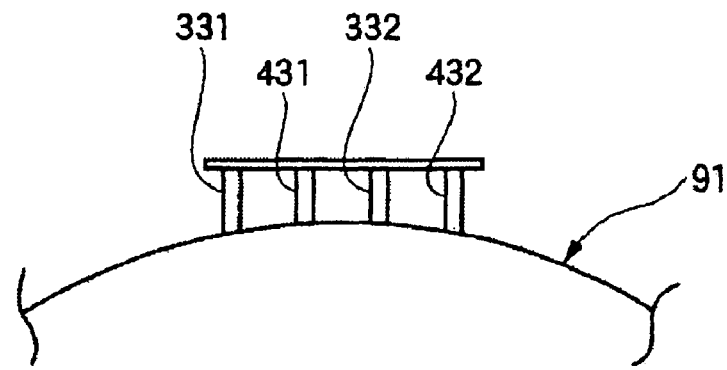
FIG. 7A is a schematic view of a large diameter stepping motor with four terminal pins arranged circumferentially in a substantially straight line.
Figure 7B:
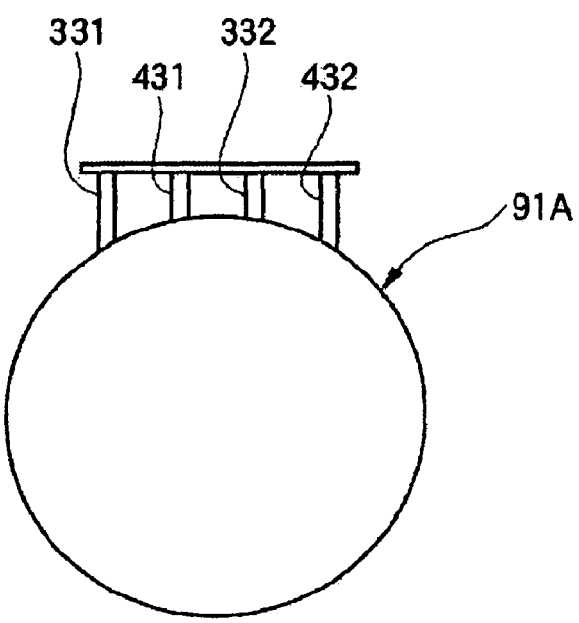
FIG. 7B is a schematic view of a stepping motor which has a smaller diameter than the stepping motor of FIG. 7A while retaining the same terminal pin layout and dimension.

The advantages of the stepping motor 11 according to the first embodiment of the present invention will be described with reference to FIGS. 7A, 7B and 7C. FIG. 7A shows a stepping motor 91 having a large diameter. The stepping motor 91 includes four terminal pins, specifically a pair of 331 and 332, and pair of 431 and 432, which are arranged in a substantially straight line in the circumferential direction as described earlier (refer to FIGS. 16A and 16B). Referring to FIG. 7B, a stepping motor 91A has a smaller diameter than the stepping motor 91 of FIG. 7A but includes the same terminal pin arrangement and dimension the stepping motor 91 has.

Figure 7C:
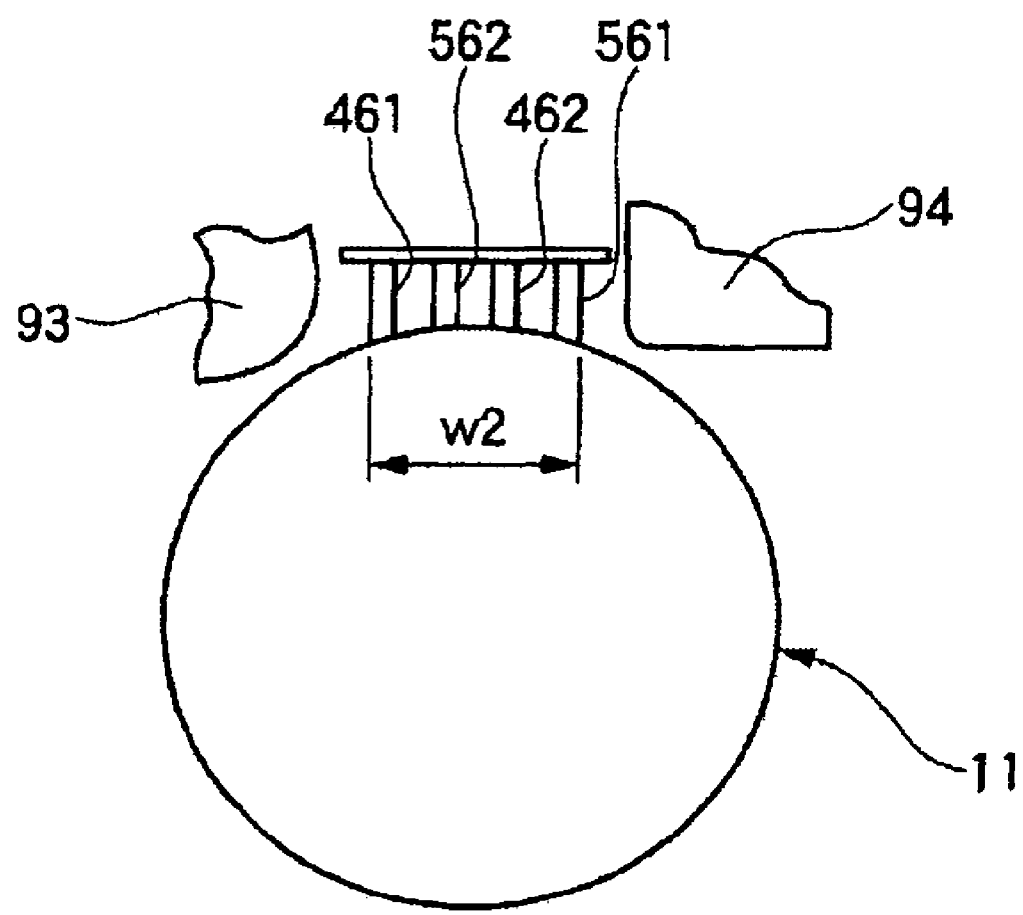
FIG. 7C is a schematic view of the terminal pin layout (shown in FIG. 5A) of the stepping motor of FIG. 1 which has the same diameter as the stepping motor of FIG. 7B.
Figure 11:
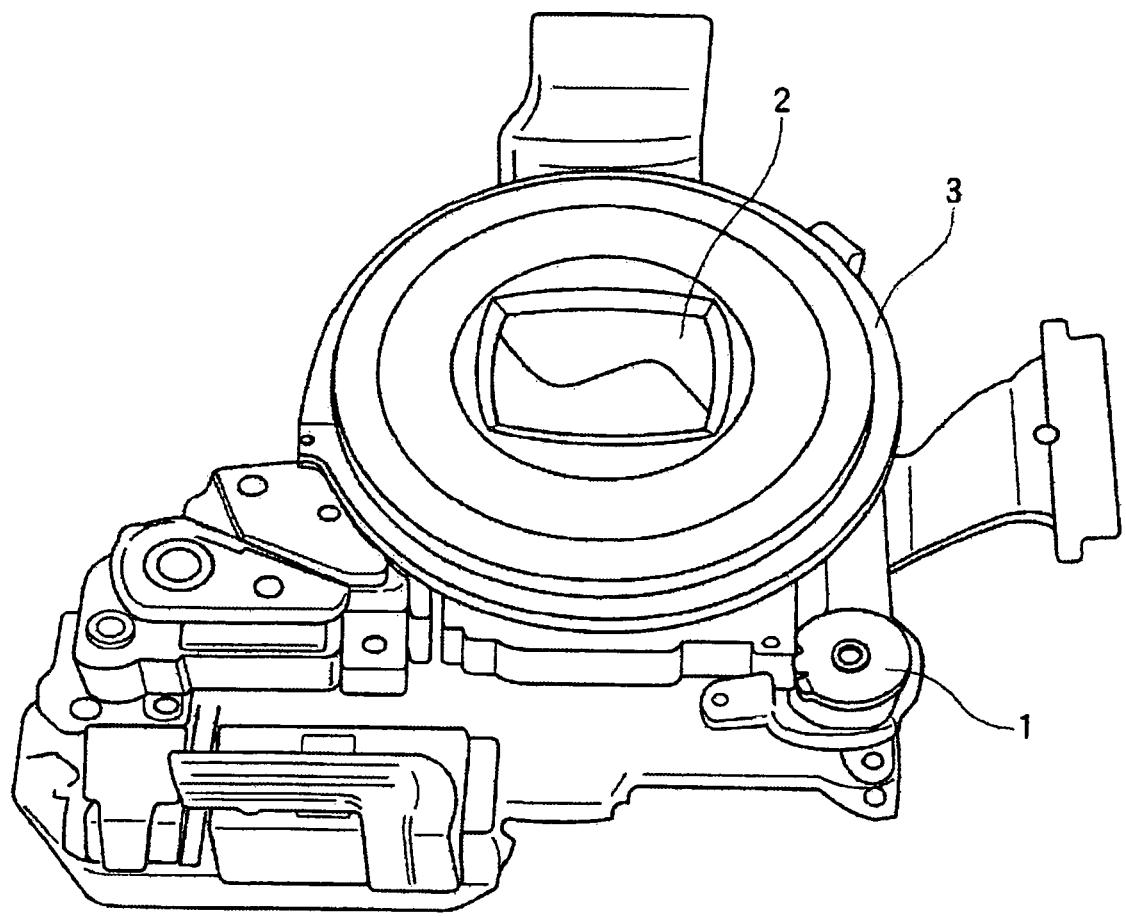
FIG. 11 is a perspective view of a shutter mechanism of a typical digital camera as an example usage of a small stepping motor.
Figure 12:
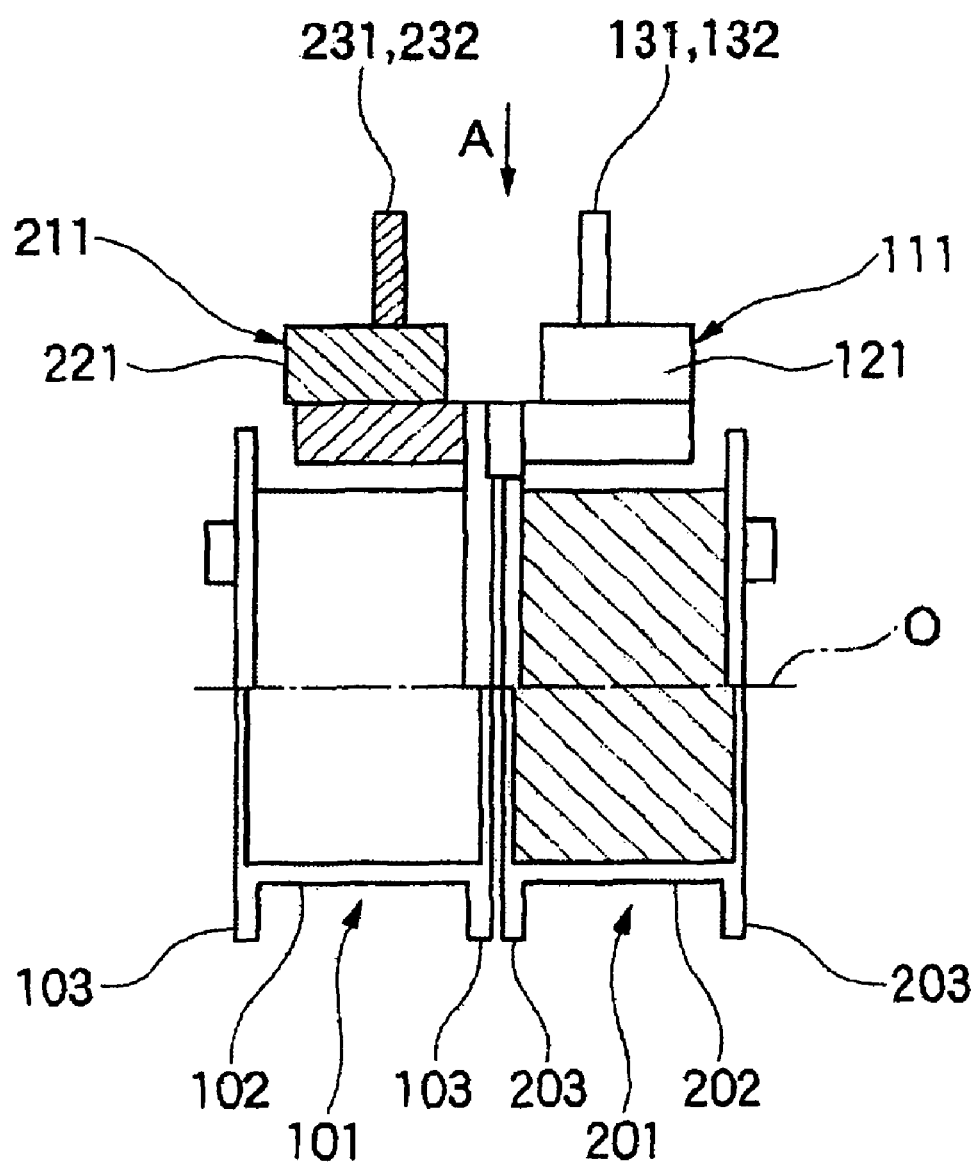
FIG. 12 is a schematic side view of a pair of conventional bobbins coupled to each other.
Figure 13:
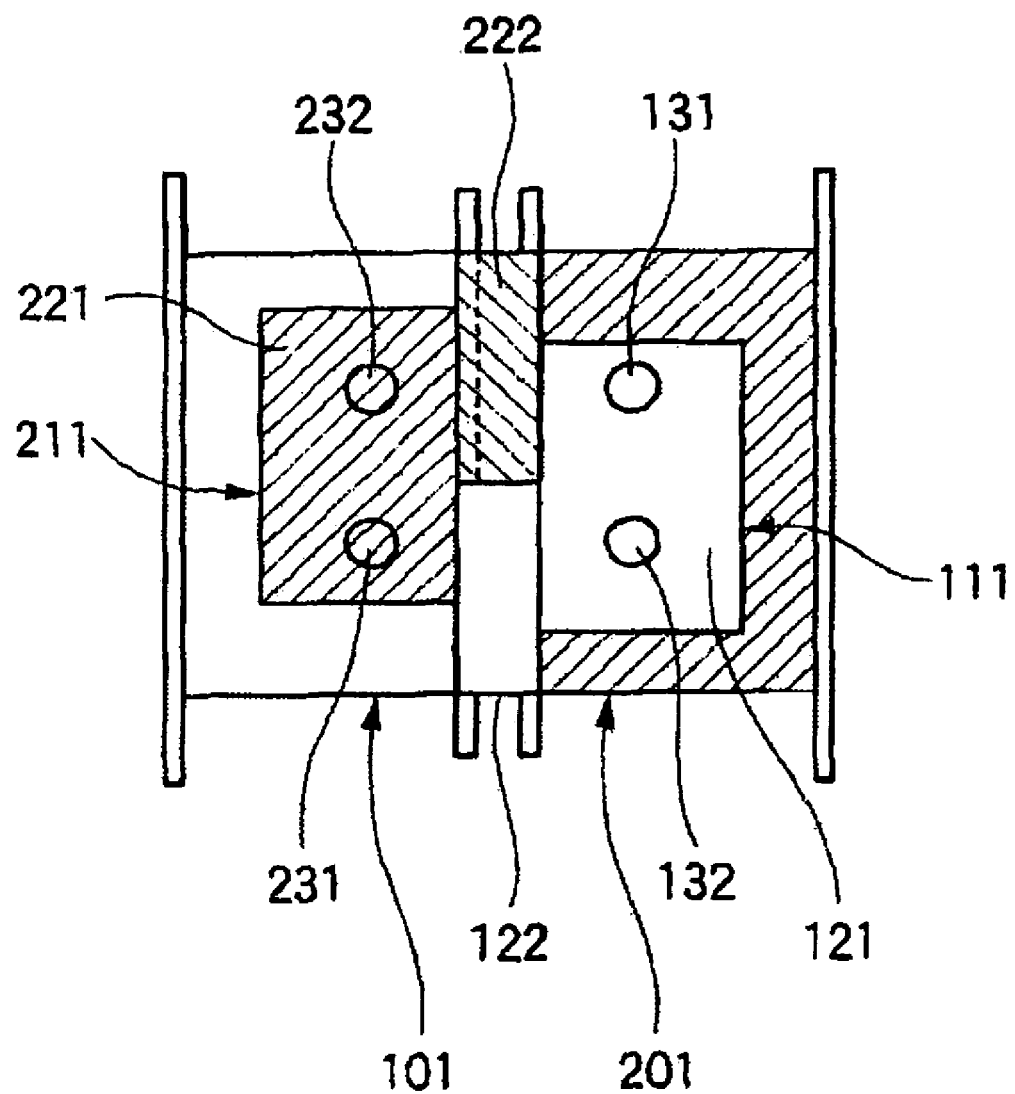
FIG. 13 is a top plan view of the pair of conventional bobbins of FIG. 12, viewed in a direction indicated by arrow A shown in FIG. 12.
Figure 14:
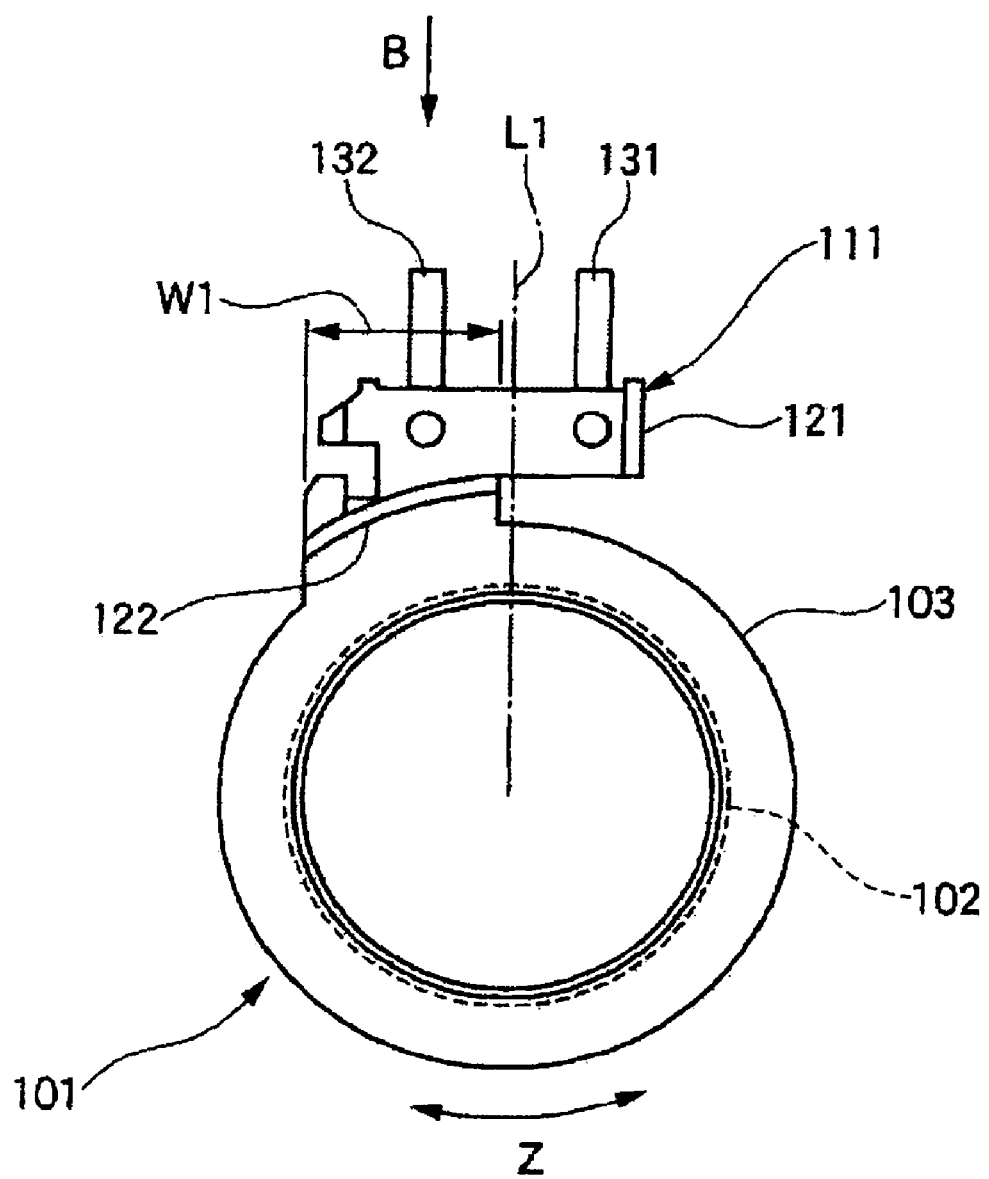
FIG. 14 is a front elevation view of one bobbin of the pair of conventional bobbins of FIG. 12.
Figure 15:
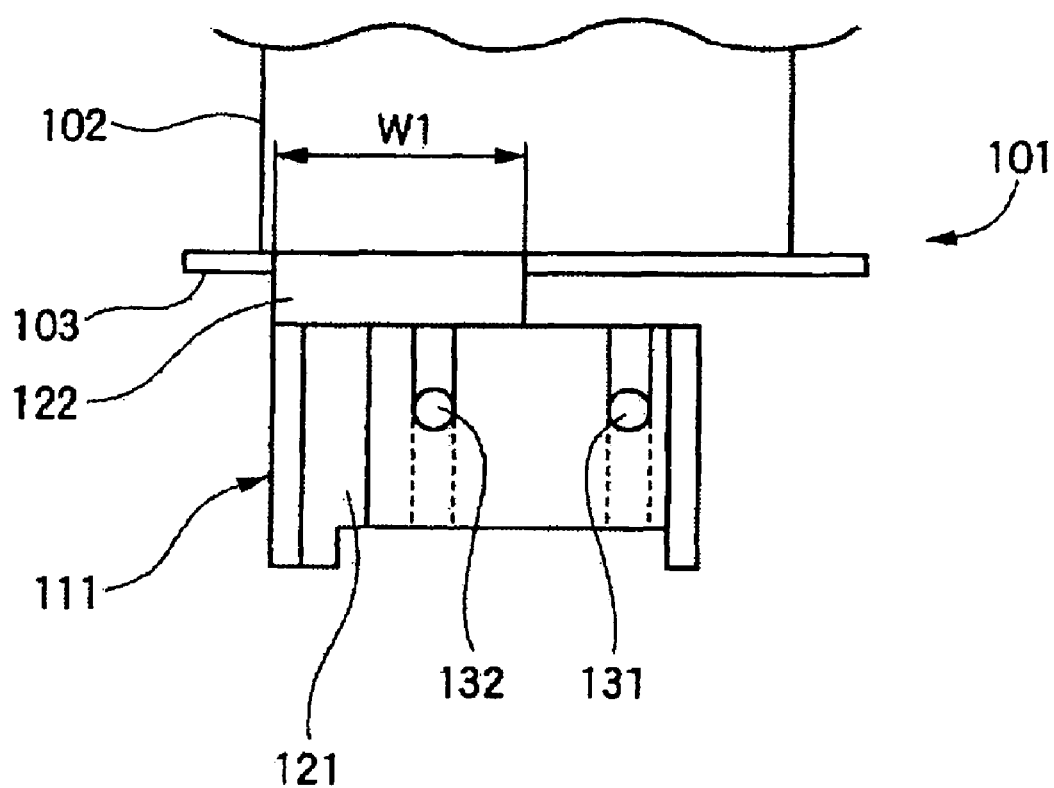
FIG. 15 is an enlarged top plan view of a relevant portion of the one conventional bobbin of FIG. 14, viewed in a direction indicated by arrow B shown in FIG. 14.

Referring now to FIG. 7C showing the first embodiment of the present invention, in the stepping motor 11 which has the same diameter as the stepping motor 91A of FIG. 7B, the four terminal pins 461, 462, 561 and 562 are arranged such that the pair of 461 and 462 and the pair of 561 and 562 are arrayed circumferentially in respective two straight lines apart from each other as shown in FIG. 5A, and therefore the distance between the pair of 461 and 462 (561 and 562) can be reduced to about half of the distance between the pair of 331 and 332 (431 and 432), which results in significantly reducing the circumferential dimension (w2 in FIG. 7C) of the entire terminal pin layout. Thus, open areas are generated at the sides of the terminal pin layout. Such the open areas are valuable in a small device, such as the earlier mentioned digital camera shown in FIG. 11. For example, some components 93 and 94 of the digital camera may be effectively placed in the open areas as shown in FIG. 7C.

Thanks to the terminal pin arrangement of the stepping motor 11 according to the first embodiment of the present invention, the motor diameter can possibly be reduced to as small as 6 mm or less.

Also, in the stepping motor 11, the terminal blocks 451 and 452 of the bobbin 41 having the terminal pins 461 and 462 and the terminal blocks 551 and 552 of the bobbin 51 having the terminal pins 561 and 562 are shaped basically in a simple rectangular solid body axially outwardly extending directly from the terminal flanges 43 and 53 of the bobbins 41 and 51 so as to overhang parts of the bobbins 51 and 41, respectively, as shown in FIGS. 3 and 4, and therefore can be formed of an insulating resin material by injection-molding into an integrated structure with reduced possibility of deformation compared with the conventional structure where the terminal block communicates with the flange of the bobbin via a bridge portion. Accordingly, the dimensional and positional accuracy of the terminal blocks 451, 452, 551 and 552 can be enhanced, which consequently enhances the positional accuracy of the terminal pins 461, 462, 561 and 562 implanted therein.

Thanks to the reliability of the positional accuracy of the terminal pins 461, 462, 561 and 562, the process of soldering the terminal pins to an outside circuit (flexible printed circuit) can be better automated.

The two stator units 21 and 31 of the stepping motor 11 respectively including the bobbins 41 and 51 can be engagingly coupled to each other such that the two stator units 21 and 31 are axially brought together such that the terminal blocks 451 and 452 of the bobbin 41 intermesh with the terminal blocks 551 and 552 of the bobbin 51. Thus, the two stator units 21 and 31 can be coupled together by an axial direction operation only rather than additionally requiring a circumferential rotation operation, which results in improving the productivity.

Since the circumferential rotation operation is not required for coupling together the two stator units 21 and 31, the lead-out lines 441 and 442 of the winding 44 and the lead-out lines 541 and 542 of the winding 54, even if loosely wired, are unlikely to get scrubbed or caught during the process of coupling the stator units 21 and 31, thus preventing wire damages at this process.

Also, in the stepping motor 11, the terminal pins 461, 462, 561 and 562 are arranged so that the formula $Y \geq (\sqrt{3}/2)X$ is established where X is the circumferential distance between the pair of terminal pins 461 and 462 of the bobbin 41 (or between the pair of terminal pins 561 and 562 of the bobbin 51), and Y is the axial distance between the terminal pin 461/462 of the bobbin 41 and the terminal pin 561/562 of the bobbin 51. Accordingly, the bobbin diameter or motor diameter can be successfully reduced as long as the circumferential distance X is set at or above the minimum required for allowing the soldering work at each terminal pin to be performed without impairing the workability.

Further, in the stepping motor 11, the bobbin 41 (51) is provided with the first and second wire paths 71 and 81 adapted to guide and house the lead-out lines 441 and 442 (541 and 542) of the winding 44 (54), whereby the lead-out lines 441 and 442 (541 and 542) are prevented from sticking out above the inner face of the terminal flange 43 (53) and sticking out of the terminal blocks 451 and 452 (551 and 552). Consequently, it is prevented from happening that the lead-out lines 441 and 442 (541 and 542) get scrubbed or caught to be damaged at the process of forming the winding 44 (54) or coupling together the two stator units 21 and 31 including the bobbins 41 and 51, thus enhancing the productivity and reliability.

Since the two bobbins 41 and 51 in the stepping motor 11 are structured identically with each other, only one same molding die is required, and also the number of components is reduced, whereby the production cost can be reduced and also the parts control can be eased.

A second embodiment of the present invention will be described with reference to FIGS. 8, 9 and 10. In explaining the example of FIGS. 8, 9 and 10, any components that correspond to those of the first embodiment and basically have the same structure are denoted by the same reference numerals, and a detailed description thereof will be omitted.

Figure 8:
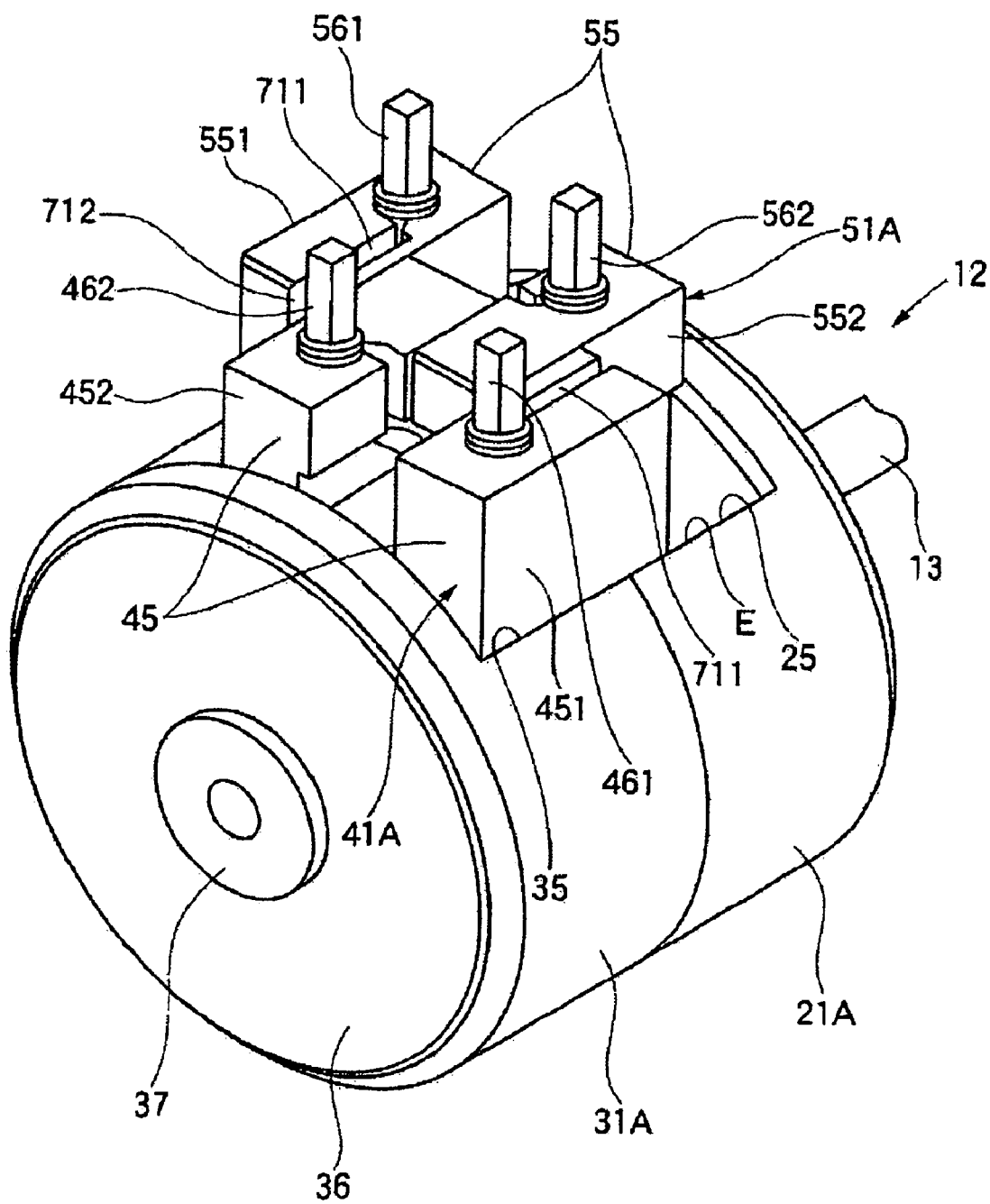
FIG. 8 is a perspective view of a stepping motor according to a second embodiment of the present invention.
Figure 9:
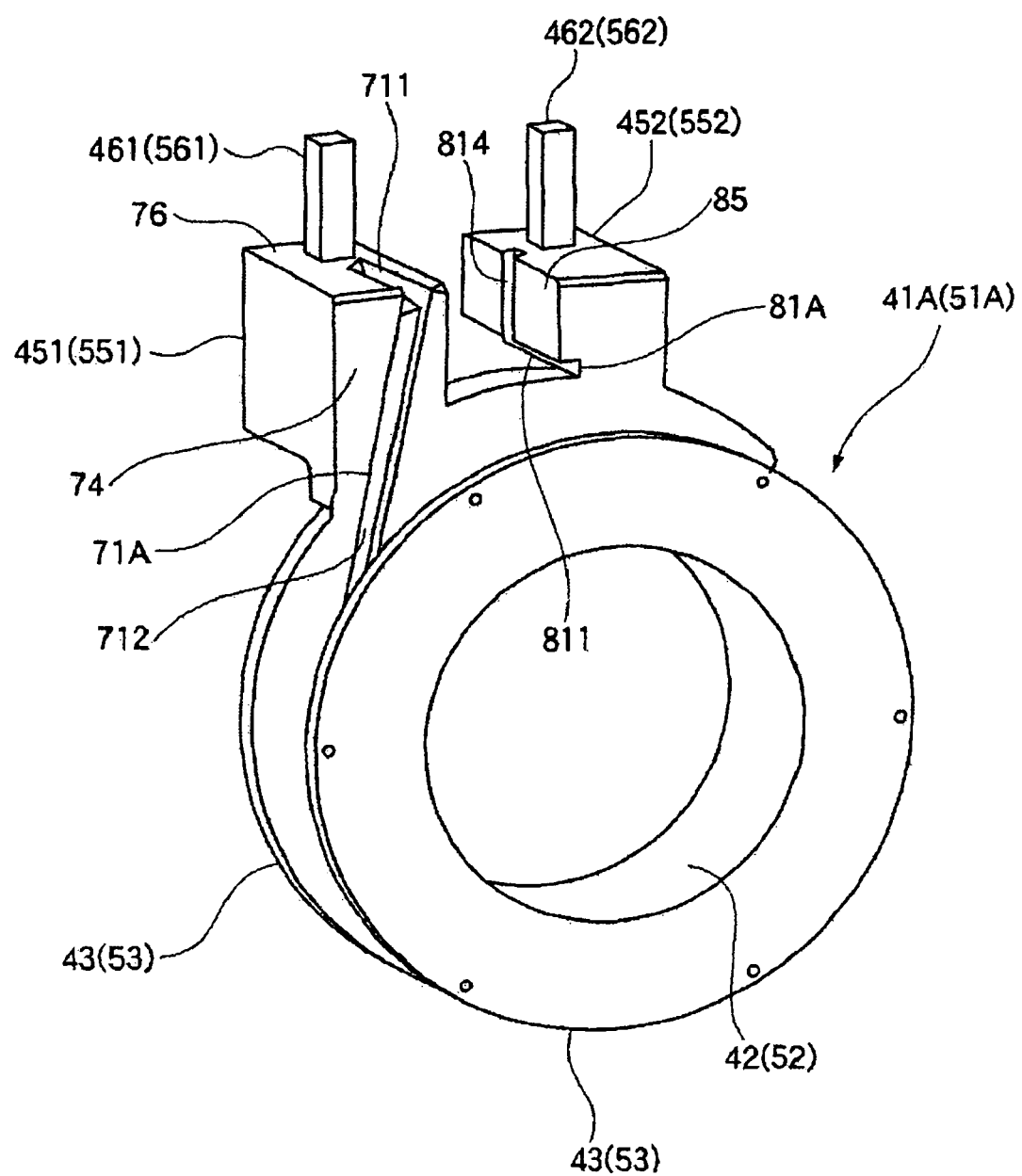
FIG. 9 is a perspective view of one bobbin of a pair of bobbins of the stepping motor of FIG. 8.

Referring to FIGS. 8 and 9, a stepping motor 12 according to the second embodiment includes two stator units 21A and 31A which respectively include first and second bobbins 41A and 51A having respective windings 44 and 54 (see FIG. 10) therearound and housed respectively in first and second stator frames like the stepping motor 11 according to the first embodiment. The first/second bobbin 41A (51A) includes a first terminal block 451 (551) and a second terminal block 452 (552). The first terminal block 451(551) is provided with a first wire path 71A formed so as to connect between a cylinder portion 42 (52) and a terminal pin 461 (561) and adapted to guide and house a starting lead-out line 441 (541) of the winding 44 (54) wound around the cylinder portion 42 (52), and the second terminal block 452 (552) is provided with a second wire path 81A to connect between the outer peripheral rim of a terminal flange 43 (53) and a terminal pin 462 (562) and adapted to guide and house a finishing lead-out line 442 (452) of the winding 44 (54) wound around the cylinder portion 42 (52).

The first and second wire paths 71A and 81A are composed differently from the first and second wire paths 71 and 81 of the stepping motor 11 according to the first embodiment. The first wire path 71A is composed of an axial passage 711 formed at an radially outer face 76 of the first terminal block 451 (551) so as to start from the foot area of the terminal pin 461 (561), to extend along and close to an edge line of the radially outer face 76 facing the second terminal block 462 (562) and to arrive at a proximal end face 74 of the first terminal block 451 (551) communicating with the inner face of the terminal flange 43 (53) in a flush manner, and a passage 712 formed as to continue from the axial passage 711 through the proximal end face 74 of the first terminal block 451 (551) and then through the inner face of the terminal flange 43 (53) and to arrive at the cylinder portion 42 (52). The second wire path 81A is composed of an axial passage 811 formed at an edge line of the second terminal block 452 (552) adjacent to the terminal flange 43 (53) so as to start from the inner face of the terminal flange 43 (53) up to the middle of the edge line, and a radial passage 814 formed at a side face 85 of the second terminal block 452 (552) facing the first terminal block 462 (562) so as to continue from the axial passage 811 toward the terminal pin 462 (562).

Figure 10:
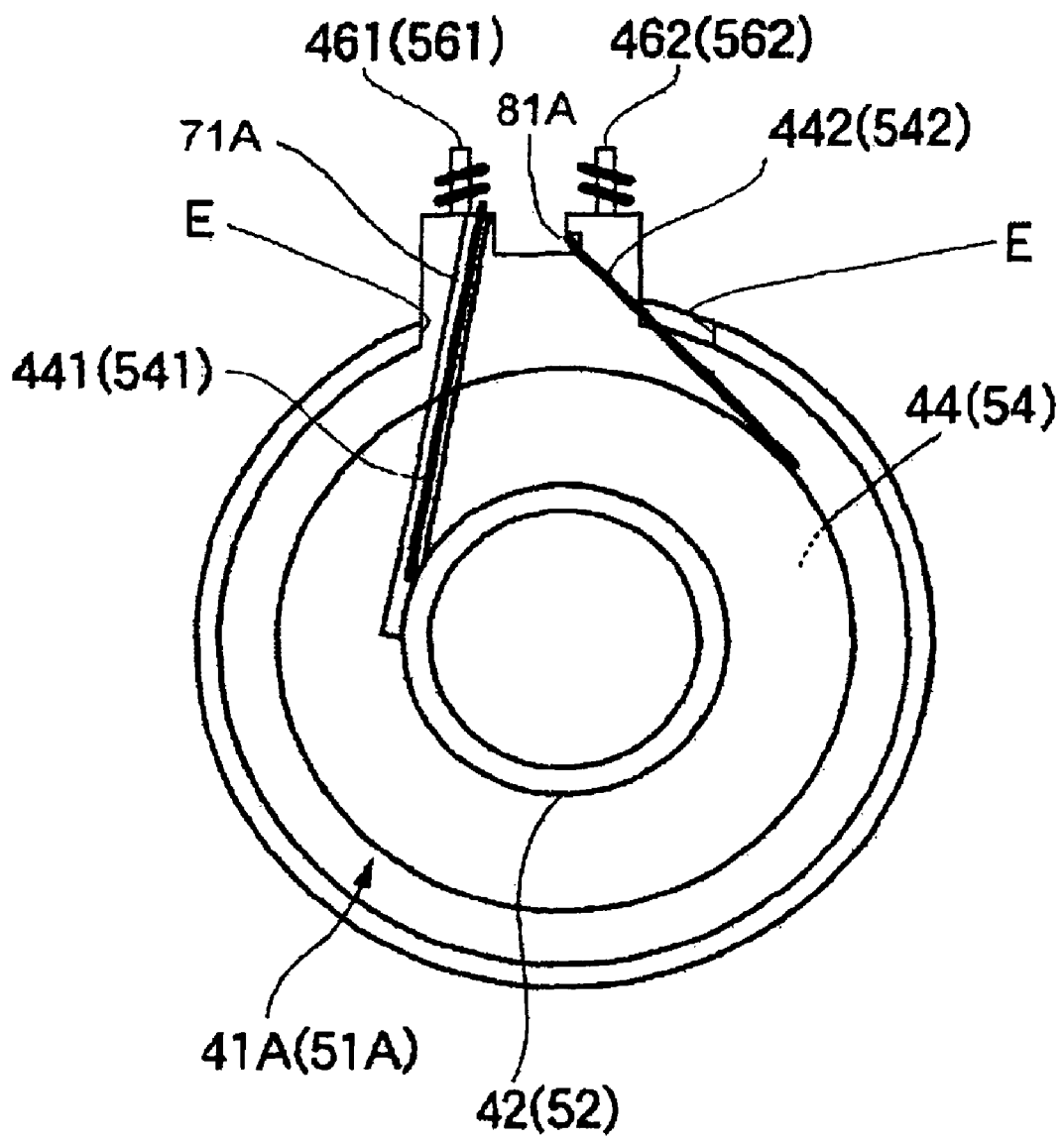
FIG. 10 is an explanatory view of a wiring of lead-out lines of a winding in the stepping motor of FIG. 8.

Referring to FIG. 10, thanks to the provision of the wire path 81A, the finishing lead-out line 442 (542) of the winding 44 (54) is allowed to take off from the outer circumference of the winding 44 (54) at a reduced angle, whereby the finishing lead-out line 442 (542) is less likely to make contact with an edge E of the stator frame of the stator unit 21A (31A) thus preventing problems such as wire damage, short circuit, or the like. Also, this eliminates the necessity of crossing the lead-out lines 441 (541) and 442 (542) thus preventing a short circuit problem.

While the present invention has been illustrated and explained with respect to specific embodiments thereof, it is to be understood that the present invention is by no means limited thereto but encompasses all changes and modifications that will become possible within the scope of the appended claims.

For example, the present invention is not limited in the number of terminal blocks for each bobbin to "two" as explained in the embodiments described above, and three or more terminal blocks for engagement coupling may be disposed for each bobbin depending on step control accuracy, or other conditions. Also, an electrical contact member does not have to be shaped like "pin" (terminal pin) but may be shaped like "elongate plate", or the like, according to the structure of the mating member.

What is claimed is:

1. A small diameter stepping motor comprising two stator units which are coupled to each other and which each have an opening portion and each include a bobbin formed of an insulating material, the bobbin comprising:
   a circular hollow cylinder portion having a winding wound therearound;
   two flanges disposed respectively at both ends of the cylinder portion; and
   a terminal structure disposed at one flange of the two flanges, radially projecting out through the opening portion, and comprising at least two terminal blocks and a pair of electrical contact members at which lead-out lines of the winding are terminated, wherein the at least two terminal blocks are shifted in position from each other in a circumferential direction about an axis of the cylinder portion and extend axially outwardly, and the terminal blocks of one bobbin of the two bobbins intermesh with the terminal blocks of the other bobbin of the two bobbins such that the terminal blocks of the one bobbin extend in an axial direction from a position adjacent to the other bobbin to a position above the winding wound on the other bobbin and vice versa, wherein the electrical contact members are provided on the terminal blocks of the one bobbin of the two bobbins at positions above the winding wound on the other bobbin of the two bobbins and are provided on the terminal blocks of the other bobbin of the two bobbins at positions above the winding wound on the one bobbin of the two bobbins, and wherein the pair of electrical contact members of the one bobbin and the pair of electrical contact members of the other bobbin are located at positions shifted from each other in the circumferential direction such that the electrical contact members of each bobbin are not aligned in the axial direction.

2. A small diameter stepping motor according to claim 1, wherein a formula: Y≧({square root over (3)}/2)X is established, where X is a circumferential distance between the pair of electrical contact members of each of the two bobbins, and Y is an axial shift distance between the electrical contact member of the one bobbin and the electrical contact member of the other bobbin.

3. A small diameter stepping motor according to claim 1, wherein the two bobbins each has grooves to guide and house the lead-out lines of the winding.

4. A small diameter stepping motor according to claim 1, wherein the opening portion has a shape corresponding to a configuration of the terminal structure such that the opening portion is substantially fully occupied by the at least two terminal blocks of the bobbin when the two stator units are coupled to each other.

5. A small diameter stepping motor according to claim 1, wherein the two bobbins are configured identically with each other.

6. A method of manufacturing a small diameter stepping motor including two stator units which each have a stator frame including an outer yoke and an inner yoke, each of the outer yoke and an inner yoke having a plurality of pole teeth at an inner circumference thereof, the method comprising:

putting a bobbin into the outer yoke in each of the two stator units, wherein the bobbin is formed of an insulating material and comprises: a hollow circular cylinder portion having a winding wound around; two flanges formed respectively at both ends of the cylinder portion; a terminal structure which is formed at one flange of the two flanges, at least two terminal blocks located circumferentially shifted from each other and extending axially outwardly, and a pair of electrical contact members to have lead-out lines of the winding terminated thereat;

attaching the inner yoke to the outer yoke having the bobbin housed therein such that the respective pole teeth intermesh with each other, to form each of the two stator units; and engagingly coupling the two stator units to each other such that the at least two terminal blocks of the terminal structure of the bobbin of one stator unit intermesh with the at least two terminal blocks of the terminal structure of the bobbin of the other stator unit such that the at least two terminal blocks of the one bobbin extend in an axial direction from a position adjacent to the other bobbin to a position above the winding wound on the other bobbin and vice versa, the electrical contact members provided on the terminal blocks of the one bobbin and the electrical contact members provided on the terminal blocks of the other bobbin of the two bobbins being located at positions shifted from each other in the circumferential direction such that the electrical contact members of each bobbin are not aligned in the axial direction, the electrical contact members being provided on the terminal blocks of the one bobbin of the two bobbins at positions above the winding wound on the other bobbin of the two bobbins and being provided on the terminal blocks of the other bobbin of the two bobbins at positions above the winding wound on the one bobbin of the two bobbins.

7. A method of manufacturing a small diameter stepping motor according to claim 6, wherein the two stator units are engagingly coupled to each other without rotation operation.

8. A bobbin formed of an insulating material, the bobbin comprising:

a hollow circular cylinder portion having a winding wound therearound;

two flanges disposed respectively at both ends of the cylinder portion; and a terminal structure disposed at one flange of the two flanges, the terminal structure comprising at least two terminal blocks and a pair of electrical contact members at which starting and finishing lead-out lines of the winding are terminated, wherein the at least two terminal blocks are shifted in position from each other in a circumferential direction about an axis of the cylinder portion and extend both axially outwardly and radially outwardly, wherein the at least two terminal blocks are configured to intermesh with at least two additional terminal blocks located on an adjacent bobbin and wherein the at least two terminal blocks are configured to extend in an axial direction from a position adjacent to the adjacent bobbin to a position above the winding wound on the adjacent bobbin and vice versa, wherein the electrical contact members are provided on the terminal blocks of the one bobbin of the two bobbins at positions above the winding wound on the other bobbin of the two bobbins and are provided on the terminal blocks of the other bobbin of the two bobbins at positions above the winding wound on the one bobbin of the two bobbins and wherein the pair of electrical contact members of the one bobbin and the pair of electrical contact members of the other bobbin are located at positions shifted from each other in the circumferential direction such that the electrical contact members of each bobbin are not aligned in the axial direction, and wherein wire paths each adapted to guide and house one of the starting and finishing lead-out lines of the winding is provided at any terminal block of the at least two terminal blocks, that is provided with the electrical contact member.

9. A bobbin according to claim 8, wherein the wire path for the starting lead-out line of the winding is disposed at one terminal block provided with the electrical contact member and connects between the one terminal block and the cylinder portion, and the wire path for the finishing lead-out line of the winding is disposed at a portion of another terminal block provided with the electrical contact element, the portion facing the one terminal block having the wire path for the starting lead-out line.

10. A small diameter stepping motor according to claim 3, wherein only one of the terminal blocks of each bobbin comprises the grooves to guide and house the lead-out lines of the winding.

11. A bobbin according to claim 8, wherein only one of the terminal blocks of each bobbin comprises the wire paths to guide and house the lead-out lines of the winding.

12. A small diameter stepping motor according to claim 4, wherein portions of a frame of each bobbin at least partially extend between and adjacent to the terminal blocks of each bobbin to substantially fully occupy the opening portion.

* * * * *